US012499541B2

(12) United States Patent
Bade et al.

(10) Patent No.: US 12,499,541 B2
(45) Date of Patent: Dec. 16, 2025

(54) APPARATUS AND METHOD FOR TRAINING A MACHINE LEARNING MODEL TO AUGMENT SIGNAL DATA AND IMAGE DATA

(71) Applicant: Anumana, Inc., Cambridge, MA (US)

(72) Inventors: Sairam Bade, Thelangana Suryapet (IN); Yash Mishra, Bangalore (IN); Shiva Verma, Bangalore (IN); Shashi Kant, Bengaluru (IN); Uddeshya Upadhyay, Bengaluru (IN); Ashim Prasad, Bangalore (IN); Rakesh Barve, Bengaluru (IN); Samir Awasthi, Boston, MA (US)

(73) Assignee: Anumana, Inc., Cambridge, MA (US)

( * ) Notice: Subject to any disclaimer, the term of this patent is extended or adjusted under 35 U.S.C. 154(b) by 0 days.

(21) Appl. No.: 18/652,364

(22) Filed: May 1, 2024

(65) Prior Publication Data
US 2025/0342581 A1 Nov. 6, 2025

(51) Int. Cl.
*G06T 7/00* (2017.01)
*G06N 3/08* (2023.01)
(Continued)

(52) U.S. Cl.
CPC ............ *G06T 7/0012* (2013.01); *G06N 3/08* (2013.01); *G06V 10/40* (2022.01); *G06V 10/82* (2022.01); *G06T 2207/30004* (2013.01)

(58) Field of Classification Search
CPC ........ G06T 7/0012; G06T 2207/30004; G06V 10/40; G06V 10/82; G06N 3/08
See application file for complete search history.

(56) References Cited

U.S. PATENT DOCUMENTS 7,424,137 B2   9/2008 Badilini et al.
8,798,725 B2 *  8/2014 Mahmood ............ A61B 5/7239
                                                600/509

(Continued)

FOREIGN PATENT DOCUMENTS

CN     102038498 A    5/2011
CN     115272112 A   11/2022

OTHER PUBLICATIONS

P. Wang, B. Hou, S. Shao and R. Yan, "ECG Arrhythmias Detection Using Auxiliary Classifier Generative Adversarial Network and Residual Network," in IEEE Access, vol. 7, pp. 100910-100922, 2019, doi: 10.1109/ACCESS.2019.2930882. (Year: 2019).*

(Continued)

*Primary Examiner* — Utpal D Shah
(74) *Attorney, Agent, or Firm* — Caldwell Intellectual Property Law

(57) ABSTRACT

An apparatus and method for training a machine learning model to augment signal data and image data. The apparatus includes at least a processor and a memory communicatively connected to the at least a processor. The memory instructs the processor to receive a signal data. The memory instructs the processor to generate a digital image, wherein the digital image comprises the signal data. The memory instructs the processor to transmit the digital image to an image processing module, wherein the image processing module produces an augmented image. The memory instructs the processor to transmit the signal data to a signal processing module, wherein the signal processing module produces the augmented image. The memory instructs the processor to train a machine learning model using the augmented image.

22 Claims, 17 Drawing Sheets

(51) Int. Cl.
   *G06V 10/40* (2022.01)
   *G06V 10/82* (2022.01)

(56) References Cited

U.S. PATENT DOCUMENTS

| | | | |
|---|---|---|---|
| 10,827,938 B2* | 11/2020 | Fontanarava | G06V 10/25 |
| 2002/0001029 A1 | 1/2002 | Abe | |
| 2012/0316452 A1* | 12/2012 | Mahmood | A61B 5/72 |
| | | | 600/523 |
| 2017/0011210 A1 | 1/2017 | Cheong et al. | |
| 2020/0051696 A1* | 2/2020 | Zhao | G16H 10/60 |
| 2020/0305799 A1* | 10/2020 | Cao | A61B 5/355 |
| 2022/0130136 A1* | 4/2022 | Ando | G16H 30/20 |
| 2024/0028831 A1 | 1/2024 | Jain et al. | |
| 2024/0029460 A1 | 1/2024 | Brown et al. | |
| 2024/0061436 A1 | 2/2024 | Tsuzaki et al. | |
| 2024/0164688 A1* | 5/2024 | Asirvatham | A61B 5/327 |

OTHER PUBLICATIONS

Ullah, Amin, et al. "Classification of arrhythmia by using deep learning with 2-D ECG spectral image representation." Remote Sensing 12.10 (2020): 1685. (Year: 2020).*

M. Baydoun et al; High Precision Digitization of Paper-Based ECG Records: A Step Toward Machine Learning; IEEE Journal of Translational Engineering in Health and Medicine, vol. 7, Published & Nov. 2019.

PCT/US2025/017397; International Search Report; Date: Jul. 1, 2025; By: Authorized Officer: Harry Kim.

* cited by examiner

APPARATUS AND METHOD FOR TRAINING A MACHINE LEARNING MODEL TO AUGMENT SIGNAL DATA AND IMAGE DATA

FIELD OF THE INVENTION

The present invention generally relates to the field of machine learning. In particular, the present invention is directed to an apparatus and a method for training a machine learning model to augment signal and image data.

BACKGROUND

Building prediction models based on electrocardiogram (ECG) images can be challenging due to the varied quality of input ECG images. In many cases, the input ECG image quality is poor due to image capturing equipment, lighting, angle of capture, focus, and folds in the paper, motion artifacts, and the like.

SUMMARY OF THE DISCLOSURE

In an aspect, an apparatus for training a machine learning model to augment signal data and image data includes at least a processor and a memory communicatively connected to the at least a processor. The memory contains instructions configuring the processor to receive a signal data, generate a digital image, wherein the digital image comprises the signal data, transmit the digital image to an image processing module, wherein the image processing module produces an augmented image, transmit the signal data to a signal processing module, wherein the signal processing module produces the augmented image, train a machine learning model using the augmented image.

In another aspect, a method for training a machine learning model to augment signal data and image data includes receiving a signal data, generating a digital image, wherein the digital image comprises the signal data, transmitting the digital image to an image processing module, wherein the image processing module produces an augmented image, transmitting the signal data to a signal processing module, wherein the signal processing module produces the augmented image, training a machine learning model using the augmented image.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for training a machine learning model to augment signal data and image data. The apparatus includes at least a computing device comprised of a processor and a memory communicatively connected to the processor. The memory instructs the processor to receive a signal data. The processor generates a digital image, wherein the digital image comprises the signal data. The processor transmits the digital image to an image processing module, wherein the image processing module produces an augmented image. The processor transmits the signal data to a signal processing module, wherein the signal processing module produces the augmented image. The processor trains a machine learning model using the augmented image.

Figure 1:
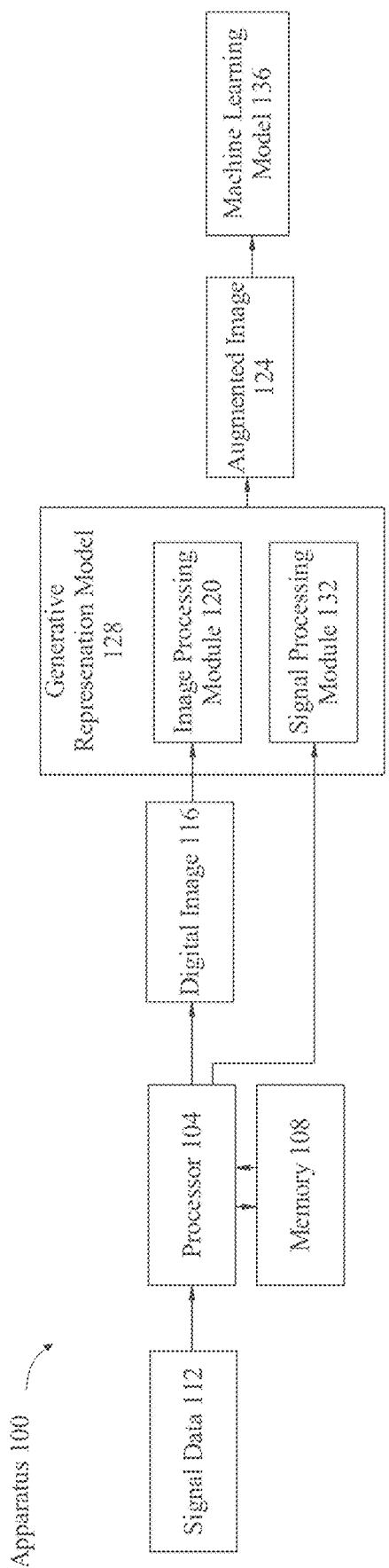
FIG. 1 is a block diagram of an apparatus for training a machine learning model to augment signal data and image data.

Referring now to FIG. 1, an exemplary embodiment of apparatus 100 for training a machine learning model to augment signal data and image data is illustrated. Apparatus 100 may include a processor 104 communicatively connected to a memory 108. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 is configured to receive signal data 112. As used in this disclosure, "signal data" is any information that is represented in the form of signals. This may include, without limitation, analog signals, digital signals, time-series signal data, spatial signals, frequency signals, multi-dimensional signals, and the like. In a non-limiting example, an analog signal is any continuous-time signal representing some other quantity, i.e., analogous to another quantity. For example, and without limitation, in an analog audio signal, the instantaneous signal voltage varies continuously with the pressure of the sound waves. Typically, analog signal refers to electrical signals; however, mechanical, pneumatic, hydraulic, and other systems may also convey or be considered analog signals. In another non-limiting example, a digital signal is a signal that represents data as a sequence of discrete values; at any given time it can only take on, at most, one of a finite number of values. In some cases, digital signals may represent information in discrete bands of analog levels, wherein all levels within a band of values represent the same information state. In a non-limiting example, a digital signal may be represented as a digital circuit. Typically, digital circuit signals can have two possible valid values; a binary signal or logic signal wherein the binary signal and the logic signal are represented by two voltage bands: one voltage band that is near a reference value, and the other voltage value that is near the supply voltage. The voltage bands correspond to the two values "zero" and "one" (or "false" and "true") of the Boolean domain, wherein at any given time, a binary signal represents one binary digit (bit). Without limitation, digital signals are generally used for communications and processing within electronic devices and computer systems. In another non-limiting example, time-series signal data is information in the form of a signal that is collected and recorded over consistent intervals of time. Without limitation, time-series signal data may be used in order to extract meaningful statistics and other characteristics of the data. Time-series signal data can be classified into two main types: continuous-time series signals and discrete-time signals. Continuous-time signals are signals that are measured and recorded over a continuous range, including, but not limited to, analog signals, such as sound waves and temperature measurements (from analog devices like analog thermometers). On the other hand, discrete-time signals are recorded at specific, distinct points. For example, and without limitation, discrete-time signals may include digital sensor measurements and financial market data sampled at fixed intervals. Signal data 112 may be stored in a signal data repository.

With continued reference to FIG. 1, as used in this disclosure, a "signal data repository" is a centralized database designed to store, manage, and access any signal data. The signal data repository may store various formatted signal data from various sources. For example, without limitation, the signal data repository may store raw and/or processed signal data in any format including analog signal data, digital signal data, time-series signal data and the like. The signal data repository may include any data associated with signal data 112 including temporal data, metadata, and the like, as discussed further below. The signal data repository may support version history of signal data 112, and archiving of signal data 112. The signal data repository may also include controls on access to authorized entities, and the like.

With continued reference to FIG. 1, wherein receiving signal data 112 may include temporal data, and metadata. As used in this disclosure, "temporal data" is information which is collected and/or recorded over a continuous-time interval or discrete-time interval. Temporal data captures signal data change over time and provides time-stamped data recordation. As used in this disclosure, a "metadata" is any additional information associated with signal data. Metadata may include, without limitation, signal name and/or identifier, a description of the signal, the signal source, and the like.

Still referring to FIG. 1, processor 104 generates digital image 116, wherein the digital image includes signal data 112. As used in this disclosure, a "digital image" is any information conveyed in an electronic format using visual elements. Digital image may include, without limitation, photos, scanned documents, ECG reports, screenshots, and the like.

With continued reference to FIG. 1, processor 104 may generate digital image 116 by processing signal data 112, wherein processing signal data 112 includes mapping signal data 112 to pixel values of digital image 116 and plotting signal data 112 to an image canvas. As used in this disclosure, "mapping" signal data into digital image data is a process that involves converting raw signal data into a digital visual representation of the signal. The mapping process may include assigning colors or brightness levels to the values of the signal data to create pixel values. Mapping signal data 112 into digital image 116 may include the use of vectors and/or a matrix. As used in this disclosure, a "vector" as defined in this disclosure is a data structure that represents one or more quantitative values and/or measures the position vector. Such vector and/or embedding may include and/or represent an element of a vector space; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where ai is attribute number i of the vector. Scaling and/or normalization may function to make vector comparison independent of absolute quantities of attributes, while preserving any dependency on similarity of attributes. A two-dimensional subspace of a vector space may be defined by any two orthogonal vectors contained within the vector space. Two-dimensional subspace of a vector space may be defined by any two orthogonal and/or linearly independent vectors contained within the vector space; similarly, an n-dimensional space may be defined by n vectors that are linearly independent and/or orthogonal contained within a vector space. A vector's "norm' is a scalar value, denoted ‖a‖ indicating the vector's length or size, and may be defined, as a non-limiting example, according to a Euclidean norm for an n-dimensional vector a as:

$$\|a\| = \sqrt{\sum_{i=0}^{n} a_i^2}$$

As used in this disclosure "matrix" is a rectangular array or table of numbers, symbols, expressions, vectors, and/or representations arranged in rows and columns. For instance, and without limitation, matrix may include rows and/or columns comprised of vectors representing signal data, where each row and/or column is a vector representing a distinct amplitude; amplitude represented by vectors in matrix may include various ranges of amplitude intensities. As a non-limiting example matrix may include maximum and minimum amplitude values of signal data within a specified range.

Matrix may be generated by performing a singular value decomposition function. As used in this disclosure a "singular value decomposition function" is a factorization of a real and/or complex matrix that generalizes the eigen decomposition of a square normal matrix to any matrix of m rows and n columns via an extension of the polar decomposition. For example, and without limitation singular value decomposition function may decompose a first matrix, A, comprised of m rows and n columns to three other matrices, U, S, T, wherein matrix U, represents left singular vectors consisting of an orthogonal matrix of m rows and m columns, matrix S represents a singular value diagonal matrix of m rows and n columns, and matrix VT represents right singular vectors consisting of an orthogonal matrix of n rows and n columns according to the vectors consisting of an orthogonal matrix of n rows and n columns according to the function:

$$A_{m \times n} = U_{m \times m} S_{m \times n} V_{n \times n}^T$$

The singular value decomposition function may find eigenvalues and eigenvectors of $AA^T$ and $A^TA$. The eigenvectors of $A^TA$ may include the columns of $V^T$, wherein the eigenvectors of $AA^T$ may include the columns of U. The singular values in S may be determined as a function of the square roots of eigenvalues $AA^T$ or $A^TA$, wherein the singular values are the diagonal entries of the S matrix and are arranged in descending order. Singular value decomposition may be performed such that a generalized inverse of a non-full rank matrix may be generated.

With continued reference to FIG. 1, as used in this disclosure, "plotting" the signal data is the process of configuring a plot, or graphical representation of data, to illustrate the signal data against a time or spatial element. Plotting signal data 112 may include defining plot parameters, such as, without limitation, adjusting the figure size, axes labels, title, gridlines, and the like. Plot As used in this disclosure, an "image canvas" is a two dimensional visual representation. An image canvas may include graphical elements such as, without limitation, lines, shapes, text, images, and the like. In a non-limiting example, an image canvas provides a virtual environment to enable the manipulation and arrangement of pixels to create visual graphics.

Still referring to FIG. 1, processor 104 transmits digital image 116 to image processing module 120, wherein image processing module 120 produces augmented image 124. As used in this disclosure, an "image processing module" is one or more distinct image processing technique designed to perform specific processing tasks and or operations to the digital image. For example, and without limitation, image processing module 120 may be configured to compile plurality of digital images to create an integrated image. In an embodiment, image processing module 120 may include a plurality of software algorithms that can analyze, manipulate, or otherwise enhance an image, such as, without limitation, a plurality of image processing techniques as described below. Image processing module 120 may include, without limitation, modules that perform modifications such as random rotation, color jitter, Gaussian blur, perspective transform, shear transform, shadow casting, reflected light, ink color swap, moire, noise texturization, Gaussian noise, salt and pepper noise, folding and creasing, crumpled paper effect, and the like, and described in detail above. In a non-limiting example, image processing module 120 may include any combination of image processing module 120. In some cases, image processing module 120 may be implemented with one or more image processing libraries such as, without limitation, OpenCV, PIL/Pillow, ImageMagick, and the like. Image processing module 120 may include, be included in, or be communicatively connected to processor 104, and/or memory 108.

With continued reference to FIG. 1, in an embodiment, image processing module 120 may be configured to compress and/or encode images to reduce the file size and storage requirements while maintaining the essential visual information needed for further processing steps as described below. In an embodiment, compression and/or encoding of plurality of images may facilitate faster transmission of images. In some cases, image processing modules 120 may be configured to perform a lossless compression on images, wherein the lossless compression may maintain the original image quality of images. In a nonlimiting example, image processing module 120 may utilize one or more lossless compression algorithms, such as, without limitation, Huffman coding, Lempel-Ziv-Welch (LZW), Run-Length Encoding (RLE), and/or the like to identify and remove redundancy in each image in a plurality of images without losing any information. In such embodiment, compressing and/or encoding each image of a plurality of images may include converting the file format of each image into PNG, GIF, lossless JPEG2000 or the like. In an embodiment, images compressed via lossless compression may be perfectly reconstructed to the original form (e.g., original image resolution, dimension, color representation, format, and the like) of images. In other cases, image processing module 120 may be configured to perform a lossy compression on plurality of images, wherein the lossy compression may sacrifice some image quality of images to achieve higher compression ratios. In a non-limiting example, image processing module 120 may utilize one or more lossy compression algorithms, such as, without limitation, Discrete Cosine Transform (DCT) in JPEG or Wavelet Transform in JPEG2000, discard some less significant information within images, resulting in a smaller file size but a slight loss of image quality of images. In such embodiment, compressing and/or encoding each image of a plurality of images may include converting the file format of each image into JPEG, WebP, lossy JPEG2000, or the like.

With continued reference to FIG. 1, in an embodiment, processing images may include determining a degree of quality of depiction of a region of interest of an image or a plurality of images. In an embodiment, image processing module 120 may determine a degree of blurriness of images. In a non-limiting example, image processing module 120 may perform a blur detection by taking a Fourier transform, or an approximation such as a Fast Fourier Transform (FFT)

of images and analyzing a distribution of low and high frequencies in the resulting frequency-domain depiction of images; for instance, and without limitation, numbers of high-frequency values below a threshold level may indicate blurriness. In another non-limiting example, detection of blurriness may be performed by convolving images, a channel of images, or the like with a Laplacian kernel; for instance, and without limitation, this may generate a numerical score reflecting a number of rapid changes in intensity shown in each image, such that a high score indicates clarity, and a low score indicates blurriness. In some cases, blurriness detection may be performed using a Gradient-based operator, which measures operators based on the gradient or first derivative of images, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of images. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of images from its frequency content. Additionally, or alternatively, image processing module 120 may be configured to rank images according to degree of quality of depiction of a region of interest and select a highest-ranking image from a plurality of digital images.

With continued reference to FIG. 1, processing images may include enhancing at least a region of interest via a plurality of image processing techniques to improve the quality (or degree of quality of depiction) of an image for better processing and analysis as described further in this disclosure. In an embodiment, image processing module 120 may be configured to perform a noise reduction operation on an image, wherein the noise reduction operation may remove or minimize noise (arises from various sources, such as sensor limitations, poor lighting conditions, image compression, and/or the like), resulting in a cleaner and more visually coherent image. In some cases, noise reduction operation may be performed using one or more image filters; for instance, and without limitation, noise reduction operation may include Gaussian filtering, median filtering, bilateral filtering, and/or the like. Noise reduction operation may be done by image processing module 120, by averaging or filtering out pixel values in neighborhood of each pixel of an image to reduce random variations.

With continued reference to FIG. 1, in another embodiment, image processing module 120 may be configured to perform a contrast enhancement operation on an image. In some cases, an image may exhibit low contrast, which may, for example, make a feature difficult to distinguish from the background. Contrast enhancement operation may improve the contrast of an image by stretching the intensity range of the image and/or redistributing the intensity values (i.e., degree of brightness or darkness of a pixel in the image). In a non-limiting example, intensity value may represent the gray level or color of each pixel, scale from 0 to 255 in intensity range for an 8-bit image, and scale from 0 to 16,777,215 in a 24-bit color image. In some cases, contrast enhancement operation may include, without limitation, histogram equalization, adaptive histogram equalization (CLAHE), contrast stretching, and/or the like. Image processing module 120 may be configured to adjust the brightness and darkness levels within an image to make a feature more distinguishable (i.e., increase degree of quality of depiction). Additionally, or alternatively, image processing module 120 may be configured to perform a brightness normalization operation to correct variations in lighting conditions (i.e., uneven brightness levels). In some cases, an image may include a consistent brightness level across a region after brightness normalization operation performed by image processing module 120. In a non-limiting example, image processing module 120 may perform a global or local mean normalization, where the average intensity value of an entire image or region of an image may be calculated and used to adjust the brightness levels.

With continued reference to FIG. 1, in other embodiments, image processing module 120 may be configured to perform a color space conversion operation to increase degree of quality of depiction. In a non-limiting example, in case of a color image (i.e., RGB image), image processing module 120 may be configured to convert RGB image to grayscale or HSV color space. Such conversion may emphasize the differences in intensity values between a region or feature of interest and the background. Image processing module 120 may further be configured to perform an image sharpening operation such as, without limitation, unsharp masking, Laplacian sharpening, high-pass filtering, and/or the like. Image processing module 120 may use image sharpening operation to enhance the edges and fine details related to a region or feature of interest within an image by emphasizing high-frequency components within an image.

With continued reference to FIG. 1, processing images may include isolating a region or feature of interest from the rest of an image as a function of plurality of image processing techniques. Images may include highest-ranking image selected by image processing module 120 as described above. In an embodiment, plurality of image processing techniques may include one or more morphological operations, wherein the morphological operations are techniques developed based on set theory, lattice theory, topology, and random functions used for processing geometrical structures using a structuring element. A "structuring element," for the purpose of this disclosure, is a small matrix or kernel that defines a shape and size of a morphological operation. In some cases, structing element may be centered at each pixel of an image and used to determine an output pixel value for that location. In a non-limiting example, isolating a region or feature of interest from an image may include applying a dilation operation, wherein the dilation operation is a basic morphological operation configured to expand or grow the boundaries of objects (e.g., a cell, a dust particle, and the like) in an image. In another non-limiting example, isolating a region or feature of interest from an image may include applying an erosion operation, wherein the erosion operation is a basic morphological operation configured to shrink or erode the boundaries of objects in an image. In another non-limiting example, isolating a region or feature of interest from an image may include applying an opening operation, wherein the opening operation is a basic morphological operation configured to remove small objects or thin structures from an image while preserving larger structures. In a further non-limiting example, isolating a region or feature of interest from an image may include applying a closing operation, wherein the closing operation is a basic morphological operation configured to fill in small gaps or holes in objects in an image while preserving the overall shape and size of the objects. These morphological operations may be performed by image processing module 120 to enhance the edges of objects, remove noise, or fill gaps in a region or feature of interest before further processing.

With continued reference to FIG. 1, in an embodiment, isolating a region or feature of interest from an image may include utilizing an edge detection technique, which may detect one or more shapes defined by edges. An "edge detection technique," as used in this disclosure, includes a mathematical method that identifies points in a digital image, at which the image brightness changes sharply and/or has a discontinuity. In an embodiment, such points may be organized into straight and/or curved line segments, which may be referred to as "edges." Edge detection technique may be performed by image processing module 120, using any suitable edge detection algorithm, including without limitation Canny edge detection, Sobel operator edge detection, Prewitt operator edge detection, Laplacian operator edge detection, and/or Differential edge detection. Edge detection technique may include phase congruency-based edge detection, which finds all locations of an image where all sinusoids in the frequency domain, for instance as generated using a Fourier decomposition, may have matching phases which may indicate a location of an edge. Edge detection technique may be used to detect a shape of a feature of interest such as a cell, indicating a cell membrane or wall; in an embodiment, edge detection technique may be used to find closed figures formed by edges.

Referring to FIG. 1, in a non-limiting example, identifying one or more features from digital image 116 may include isolating one or more areas of interests using one or more edge detection techniques. An area of interest may include a specific area within a digital image that contains information relevant to further processing, such as one or more image features. In a non-limiting example, image data located outside an area of interest may include irrelevant or extraneous information. Such portion of digital image 116 containing irrelevant or extraneous information may be disregarded by image processing module 120, thereby allowing resources to be concentrated at a targeted area of interest. In some cases, the area of interest may vary in size, shape, and/or location within digital image 116. In a non-limiting example the area of interest may be the ECG trace. In some cases, the area of interest may specify one or more coordinates, distances, and the like. Image processing module 120 may then be configured to isolate the area of interest from digital image 116 based on the particular feature. In a non-limiting example, image processing module 120 may crop an image according to a bounding box around an area of interest.

With continued reference to FIG. 1, image processing module 120 may be configured to perform a connected component analysis (CCA) on an image for feature of interest isolation. As used in this disclosure, a "connected component analysis (CCA)," also known as connected component labeling, is an image processing technique used to identify and label connected regions within a binary image (i.e., an image which each pixel having only two possible values: 0 or 1, black or white, or foreground and background). "Connected regions," as described herein, is a group of adjacent pixels that share the same value and are connected based on a predefined neighborhood system such as, without limitation, 4-connected or 8-connected neighborhoods. In some cases, image processing module 120 may convert an image into a binary image via a thresholding process, wherein the thresholding process may involve setting a threshold value that separates the pixels of an image corresponding to feature of interest (foreground) from those corresponding to the background. Pixels with intensity values above the threshold may be set to 1 (white) and those below the threshold may be set to 0 (black). In an embodiment, CCA may be employed to detect and extract feature of interest by identifying a plurality of connected regions that exhibit specific properties or characteristics of the feature of interest. Image processing module 120 may then filter plurality of connected regions by analyzing plurality of connected regions properties such as, without limitation, area, aspect ratio, height, width, perimeter, and/or the like. In a non-limiting example, connected components that closely resemble the dimensions and aspect ratio of feature of interest may be retained, by image processing module 120 as feature of interest, while other components may be discarded. Image processing module 120 may be further configured to extract feature of interest from an image for further processing. One or more digital image 116 may be transmitted from processor 104 to image processing module 120 via any suitable electronic communication protocol, including without limitation packet-based protocols such as transfer control protocolinternet protocol (TCP-IP), file transfer protocol (FTP) or the like. Receiving images may include retrieval of digital image 116 from a data store containing images as described below; for instance, and without limitation, images may be retrieved using a query that specifies a timestamp that images may be required to match.

With continued reference to FIG. 1, as used in this disclosure, an "augmented image" is any modification that alters a visual representation of signal data. Augmented image 124 may be the product of image modification to any kind of image data in any format as described herein. Augmented image 124 may include, without limitation, modifications such as random rotation, color jitter, Gaussian blur, perspective transform, shear transform, shadow casting, reflected light, ink color swap, moire, noise texturization, Gaussian noise, salt and pepper noise, folding and creasing, crumpled paper effect, and the like, and described in detail above.

Additionally or alternatively, augmented image 124 may be the product of signal modification any kind of signal data in any format as described herein. In a non-limiting example, augmented image 124 may include alterations made directly to signal data 112 while plotting such as, modifications made to the background grid, background grid color, lead separators, reference signals, lead names, printed test, handwritten text, calibration, and signal.

With continued reference to FIG. 1, processor 104 may transform digital image 116 into augmented image 124 as a function of generative representation model 128, wherein the generative representation model includes a plurality of image processing modules. In one or more embodiments, computing device may implement one or more aspects of "generative representation model," a type of artificial intelligence (AI) that uses machine learning algorithms to create, establish, or otherwise generate data such as, without limitation, signal data, image data and/or the like in any data structure as described herein (e.g., text, image, video, audio, among others) that is similar to one or more provided training examples. In an embodiment, machine learning module described herein may generate one or more generative machine learning models that are trained on one or more set of signal data and/or image data. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

With continued reference to FIG. 1, in some cases, generative machine learning models may include one or more generative models. As described herein, "generative models" refers to statistical models of the joint probability distribution P(X, Y) on a given observable variable x, representing features or data that can be directly measured or observed (e.g., ECG raw signal data and/or ECG digital image) and target variable y, representing the outcomes or labels that one or more generative models aims to predict or generate (e.g., simulated scan image). In some cases, generative models may rely on Bayes theorem to find joint probability; for instance, and without limitation, Naïve Bayes classifiers may be employed by computing device to categorize input data such as, without limitation, ECG data into different categories, such as, without limitation, signal data or digital image data.

In a non-limiting example, and still referring to FIG. 1, one or more generative machine learning models may include one or more Naïve Bayes classifiers generated, by computing device, using a Naïve bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)+P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing Device may then calculate a likelihood table by calculating probabilities of different data entries and classification labels. Computing device may utilize a naïve Bayes equation to calculate a posterior probability for each class. A class containing the highest posterior probability is the outcome of prediction.

With continued reference to FIG. 1, although Naïve Bayes classifier may be primarily known as a probabilistic classification algorithm; however, it may also be considered a generative model described herein due to its capability of modeling the joint probability distribution P(X, Y) over observable variables X and target variable Y. In an embodiment, Naïve Bayes classifier may be configured to make an assumption that the features X are conditionally independent given class label Y, allowing generative model to estimate the joint distribution as $P(X, Y) = P(Y) \Pi_i P(X_i|Y)$, wherein P(Y) may be the prior probability of the class, and $P(X_i|Y)$ is the conditional probability of each feature given the class. One or more generative machine learning models containing Naïve Bayes classifiers may be trained on labeled training data, estimating conditional probabilities $P(X_i|Y)$ and prior probabilities P(Y) for each class; for instance, and without limitation, using techniques such as Maximum Likelihood Estimation (MLE). One or more generative machine learning models containing Naïve Bayes classifiers may select a class label y according to prior distribution P(Y), and for each feature $X_i$, sample at least a value according to conditional distribution $P(X_i|y)$. Sampled feature values may then be combined to form one or more new data instance with selected class label y. In a non-limiting example, one or more generative machine learning models may include one or more Naïve Bayes classifiers to generate new examples of simulated scan image based on signal data or image data, wherein the models may be trained using training data containing a plurality of features as input correlated to a plurality of labeled classes as output.

With continued reference to FIG. 1, in some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedbacks from the "discriminator" configured to distinguish real data from the hypothetical data. In some cases, generator may learn to make discriminator classify its output as real. In an embodiment, discriminator may include a supervised machine learning model while generator may include an unsupervised machine learning model as described in further detail with reference to FIG. 13.

With continued reference to FIG. 1, in an embodiment, discriminator may include one or more discriminative models, i.e., models of conditional probability P(Y|X=x) of target variable Y, given observed variable X. In an embodiment, discriminative models may learn boundaries between classes or labels in given training data. In a non-limiting example, discriminator may include one or more classifiers as described in further detail below with reference to FIG. 13 to distinguish between different categories e.g., real or fake or states e.g., TRUE vs. FALSE within the context of generated data such as, without limitations, simulated scan image, and/or the like. In some cases, computing device may implement one or more classification algorithms such as, without limitation, Support Vector Machines (SVM), Logistic Regression, Decision Trees, and/or the like to define decision boundaries.

In a non-limiting example, and still referring to FIG. 1, generator of GAN may be responsible for creating synthetic data that resembles real simulated scan image. In some cases, GAN may be configured to receive ECG raw signal data and/or ECG digital image as input and generates corresponding simulated scan image. On the other hand, discriminator of GAN may evaluate the authenticity of the generated content by comparing it to real scan images, for example, discriminator may distinguish between genuine and generated content and providing feedback to generator to improve the model performance.

With continued reference to FIG. 1, in some cases, one or more generative machine learning models may also be applied by computing device to edit, modify, or otherwise manipulate existing data or data structures. In an embodiment, output of training data used to train one or more generative machine learning models such as GAN as described herein may include actual scan images that linguistically or visually demonstrate modified ECG raw signal data and/or ECG digital image e.g., modifications to the background grid, background grid color, lead separators, reference signals, lead names, printed test, handwritten text, calibration, signal, and/or the like. In some cases, simulated scan image may be synchronized with ECG raw signal data and/or ECG digital image. In some cases, simulated scan image may be integrated with the ECG raw signal data and/or ECG digital image, offering user a multisensory instructional experience.

Additionally, or alternatively, and still referring to FIG. 1, computing device may be configured to continuously monitor ECG raw signal data and/or ECG digital image. In an embodiment, computing device may configure discriminator to provide ongoing feedback and further corrections as needed to subsequent input data (e.g., signal data and/or image data). In some cases, one or more sensors such as, without limitation, wearable device, motion sensor, or other sensors or devices described herein may provide signal data and/or image data that may be used as subsequent input data or training data for one or more generative machine learning models described herein. An iterative feedback loop may be created as computing device continuously receive real-time data, identify errors as a function of real-time data, delivering corrections based on the identified errors, and monitoring entity on the delivered corrections. In an embodiment, computing device may be configured to retrain one or more generative machine learning models based on user response or update training data of one or more generative machine learning models by integrating user response into the original training data. In such embodiment, iterative feedback loop may allow machine learning module to adapt to the user's needs, enabling one or more generative machine learning models described herein to learn and update based on user's response and generated feedback.

With continued reference to FIG. 1, other exemplary embodiments of generative machine learning models may include, without limitation, long short-term memory networks (LSTMs), (generative pre-trained) transformer (GPT) models, mixture density networks (MDN), and/or the like. As an ordinary person skilled in the art, upon reviewing the entirety of this disclosure, will be aware of various generative machine learning models may be used to produce augmented image 124 as a function of generative representation model 128.

With continued reference to FIG. 1, processor 104 may transform digital image 116 into augmented image 124 using the plurality of image processing modules configured to receive digital image 116 from a digital image repository and modify digital image 116. Augmented image 124 may include alterations made to digital image 116 such as, without limitation, random rotation, color jitter, Gaussian blur, perspective transform, shear transform, shadow casting, reflected light, ink color swap, Moire, noise texturization, Gaussian noise, salt and pepper noise, folding and creasing, crumpled paper effect, and the like. Random rotation modifications may introduce, without limitation, random rotations, wherein the random rotations reflect orientation variations in manually scanned documents. Color jitter modifications may include, without limitation, randomly altering brightness, contrast, saturation, and hue of the image to simulate scanner or camera color reproduction variability. Gaussian blur modifications may include, without limitation, an application of blurs to mimic out-of-focus effects or motion blur from image capturing devices (e.g., scanners, cameras, video cameras, and the like). Perspective transform modifications may include, without limitation, warping images to replicate distortions from non-flat alignment with the image capture device. Shear transform modifications may simulate, without limitation, oblique viewing angles in photographs, replicating the effect of capturing images with a camera tilted, thereby skewing the objects and text, making the objects and text appear stretched or compressed along one axis. Shadow cast modifications may include, without limitation, creating shadow effects indicative of uneven lighting during image capture. Reflected light modifications may include, without limitation, a generation of bright spots or streaks on the digital image, simulating reflections on glossy surfaces. Dirty drum modification may include, without limitation, adding streaks or spots to the digital image to represent scanner drum or glass imperfections. Light gradient modifications may include, without limitation, implementing light intensity gradients, akin to uneven lighting conditions in the surrounding environment when capturing an image using an image capturing device. Ink color swap modification includes, without limitation, alteration to the ink color in, for example an ECG trace, to represent variability in ink supply or printer settings. Moire modification includes, without limitation, producing one or more moiré patterns on the digital image to reflect interference phenomena from scanned printed materials. Noise texture modifications include, without limitation, incorporation of textural noise, simulating paper graininess or scanning texture. Gaussian noise modifications include, without limitation, an introduction of Gaussian noise in a digital image to replicate general electronic noise. Salt and pepper noise modifications include, without limitation, additions of salt and pepper noise, simulating errors in digital image capture or transmission. Folding and creasing modifications include, without limitation, simulated folds or creases overlayed on digital image to mimic a document that has been folded prior to scanning. Crumpled paper effect modification includes, without limitation, an application of texture blending to the digital image to create the appearance of a crumpled paper surface.

With continued reference to FIG. 1, as used in this disclosure, a "digital image repository" is a database for storing one or more digital images. For example, without limitation, the digital image repository may store raw and/or processed digital images in any format including joint photographic experts group (JPEG), portable network graphics (PNG), tagged image file format (TIFF), bitmap (BMP), high efficiency image file format (HEIF), and the like. The digital image repository may include any data associated with digital image 116 including metadata, and the like, as discussed further below. The digital image repository may support version history of digital image, and archiving of digital image 116. The digital image repository may also include controls on access to authorized entities, and the like.

Still referring to FIG. 1, processor 104 transmits signal data 112 to signal processing module 132, wherein signal processing module 132 produces augmented image 124. As used in this disclosure, a "signal processing module" is one or more distinct signal processing technique designed to perform specific processing tasks and or operations to a signal data. Signal processing module 132 may include, without limitation, modules that perform modifications to the background grid, background grid color, lead separators, reference signals, lead names, printed test, handwritten text, calibration, signal, and the like. The background grid modifications may include, without limitation, adjustments to the use of dashed, continuous, or absent grid lines with variable thickness to replicate the electrocardiogram paper grid. The background grid color modifications may include, without limitation, adjustments to various red, green, blue (RGB) combinations for the grid, ensuring a broad spectrum of contrast levels. The lead separator modifications may include, without limitation, options to include dashed, continuous, or no lead separators. The reference signal modifications may include, without limitation, feature variations in the position, shape, and thickness of the reference signal, including scenarios without a reference signal. The lead name modifications may include, without limitation, adjustments to the positioning and font attributes (size, thickness) of lead names to reflect real-world variations. The printed text modifications may include, without limitation, adding simulated machine-printed details (e.g., patient ID, date, calibration scale) commonly found on ECG printouts. The handwritten text modifications may include, without limitation, adding simulated data in the form of random handwritten notes to mimic manual annotations. The calibration modifications may include, without limitation, adjustments to the voltage and time calibration scales to reflect variability in the recording equipment. The signal modifications may include, without limitation, adjustments to ECG signals of varying sampling rates, line thickness, transparency, and color, with specific adjustments for depicting sharp voltage fluctuations, similar to those found in the three waves of the QRS complex representing ventricular depolarization. In a non-limiting example, signal processing module 132 may include any combination of signal processing modules.

With continued reference to FIG. 1, processor 104 may transform signal data 112 into augmented image 124 as a function of generative representation model 128, wherein generative representation model 128 comprises a plurality of signal processing modules. In a non-limiting example, signal processing module 132 may be the same or substantially the same as the processing module described in U.S. patent application Ser. No. 16/754,007, filed on Apr. 6, 2020, titled "ECG-BASED CARDIAC EJECTION-FRACTION SCREENING," which is incorporated by reference herein in its entirety. With continued reference to FIG. 1, in a non-limiting example, signal processing module 132 may be the same or substantially the same as the processing module described in U.S. patent application Ser. No. 17/275,276, filed on Mar. 11, 2021, titled "NEURAL NETWORKS FOR ATRIAL FIBRILLATION SCREENING," which is incorporated by reference herein in its entirety. With continued reference to FIG. 1, in a non-limiting example, signal processing module 132 may be the same or substantially the same as the processing module described in U.S. patent application Ser. No. 18/151,673, filed on Jan. 9, 2023, titled "NONINVASIVE METHODS FOR QUANTIFYING AND MONITORING LIVER DISEASE SEVERITY," which is incorporated by reference herein in its entirety. With continued reference to FIG. 1, in a non-limiting example, signal processing module 132 may be the same or substantially the same as the processing module described in Int. Pat. App. with PCT number PCT/US23/20362, filed on Apr. 28, 2023, titled "ARTIFICIAL-INTELLIGENCE ENHANCED SCREENING FOR CARDIAC AMYLOIDOSIS BY ELECTROCARDIOGRAPHY," which is incorporated by reference herein in its entirety. With continued reference to FIG. 1, in a non-limiting example, signal processing module 132 may be the same or substantially the same as the processing module described in U.S. Pat. App. Ser. No. 63/342,275, filed on May 16, 2022, titled "DEEP LEARNING ENABLED ELECTROCARDIOGRAPHIC PREDICTION OF COMPUTER TOMOGRAPHY-BASED HIGH CORONARY CALCIUM SCORE (CAC)," which is incorporated by reference herein in its entirety. With continued reference to FIG. 1, in a non-limiting example, signal processing module 132 may be the same or substantially the same as the processing module described in U.S. Pat. App. Ser. No. 63/499,004, filed on Apr. 28, 2023, titled "DEEP LEARNING MODEL FOR SCREENING PATIENTS FOR MYOCARDITIS USING OUTPUT OF A 12-LEAD ECG," which is incorporated by reference herein in its entirety. With continued reference to FIG. 1, in a non-limiting example, signal processing module 132 may be the same or substantially the same as the processing module described in U.S. patent application Ser. No. 18/440,414, filed on Jan. 13, 2024, titled "MACHINE-LEARNING FOR PROCESSING LEAD-INVARIANT ELECTROCARDIOGRAM INPUTS," which is incorporated by reference herein in its entirety. With continued reference to FIG. 1, in a non-limiting example, signal processing module 132 may be the same or substantially the same as the processing module described in U.S. patent application Ser. No. 16/960,236, filed on Jul. 6, 2020, titled "ECG-BASED AGE AND SEX ESTIMATION," which is incorporated by reference herein in its entirety. With continued reference to FIG. 1, in a non-limiting example, signal processing module 132 may be the same or substantially the same as the processing module described in U.S. patent application Ser. No. 13/810,064, filed on Mar. 29, 2013, titled "NONINVASIVE MONITORING OF PHYSIOLOGICAL CONDITIONS," which is incorporated by reference herein in its entirety. With continued reference to FIG. 1, in a non-limiting example, signal processing module 132 may be the same or substantially the same as the processing module described in U.S. patent application Ser. No. 15/778,405, filed on May 23, 2018, titled "PROCESSING PHYSIOLOGICAL ELECTRICAL DATA FOR ANALYTE ASSESSMENTS," which is incorporated by reference herein in its entirety. With continued reference to FIG. 1, in a non-limiting example, signal processing module 132 may be the same or substantially the same as the processing module described in U.S. patent application Ser. No. 15/842,419, filed on Dec. 14, 2017, titled "SYSTEMS AND METHODS OF ANALYTE MEASUREMENT ANALYSIS," which is incorporated by reference herein in its entirety. With continued reference to FIG. 1, in a non-limiting example, signal processing module 132 may be the same or substantially the same as the processing module described in U.S. patent application Ser. No. 18/517,640, filed on Nov. 11, 2023, titled "SYSTEMS AND APPARATUS FOR GENERATING IMAGING INFORMATION BASED ON AT LEAST A SIGNAL," which is incorporated by reference herein in its entirety. With continued reference to FIG. 1, in a non-limiting example, signal processing module 132 may be the same or substantially the same as the processing module described in U.S. patent application Ser. No. 17/500,287, filed on Oct. 13, 2021, titled "NONINVASIVE METHODS FOR DETECTION OF PULMONARY HYPERTENSION," which is incorporated by reference herein in its entirety. With continued reference to FIG. 1, in a non-limiting example, signal processing module 132 may be the same or substantially the same as the processing module described in U.S. patent application Ser. No. 17/552,246, filed on Dec. 15, 2021, titled "SYSTEMS AND METHODS FOR DIAGNOSING A HEALTH CONDITION BASED ON PATIENT TIME SERIES DA," which is incorporated by reference herein in its entirety. With continued reference to FIG. 1, in a non-limiting example, signal processing module 132 may be the same or substantially the same as the processing module described in U.S. patent application Ser. No. 17/073,211, filed on Oct. 16, 2020, titled "METHOD AND SYSTEM FOR DETERMINING QRS ONSET IN CARDIAC SIGNALS," which is incorporated by reference herein in its entirety. With continued reference to FIG. 1, in a non-limiting example, signal processing module 132 may be the same or substantially the same as the processing module described in U.S. patent application Ser. No. 17/073,220, filed on Oct. 16, 2020, titled "METHOD AND SYSTEM FOR MEASURING UNIPOLAR AND BIPOLAR CARDIAC ELECTROGRAM FRACTIONATION," which is incorporated by reference herein in its entirety. With continued reference to FIG. 1, in a non-limiting example, signal processing module 132 may be the same or substantially the same as the processing module described in U.S. patent application Ser. No. 17/821,791, filed on Aug. 23, 2022, titled "METHOD AND SYSTEM FOR MEASURING CARDIAC TISSUE HEALTH BASED ON DV/DTMIN OF A DEPOLARIZATION WAVE WITHIN A CARDIAC ELECTROGRAM," which is incorporated by reference herein in its entirety. With continued reference to FIG. 1, in a non-limiting example, signal processing module 132 may be the same or substantially the same as the processing module described in U.S. patent application Ser. No. 17/073,239, filed on Oct. 16, 2020, titled "METHOD AND SYSTEM FOR MEASURING CARDIAC ELECTROGRAM DEPOLARIZATION VOLTAGE," which is incorporated by reference herein in its entirety.

With continued reference to FIG. 1, processor 104 may transform signal data 112 into augmented image 124 using the plurality of signal processing modules configured to receive signal data 112 and modify signal data 112. Receiving signal data 112 may include, without limitation, receiving the signal data from the signal data repository and/or directly from the equipment capturing the signal data in real time.

With continued reference to FIG. 1, augmented image 124 may be used to train a signal extraction module and a downstream task model. As used in this disclosure, a "signal extraction module" is a component that is designed to extract digital ECG signals from ECG images. The signal extraction module may include training the signal extraction module to extract a signal mask, pass the input image to get the signal mask during inference, and use a computer vision algorithm to extract voltages time-series from the signal mask, as further described in FIG. 8. As used in this disclosure, a "downstream task model" is a system designed to perform a specific task. Without limitation, a downstream task model may include a convolutional neural network and/or a transformer neural network. Without limitation, a downstream task model may be trained using ECG images and/or extracted ECG signals from ECG images. In a non-limiting example, a downstream task model may include a disease prediction model, a parameter extraction model, an ECG delineation model, an ECG rhythm and abnormalities prediction model, an ECG text report generation model, a monitoring application, a prediction of mechanical and anatomical parameters related to the heart model, and the like, as further described in FIG. 6 and FIG. 7. In another non-limiting example, downstream task model may include one or more downstream task models. In another non-limiting example, the downstream task model may include the signal extraction module as described in detail below and in FIG. 8.

With continued reference to FIG. 1, the signal extraction module extracts digital signals from digital image 116. Without limitation, the signal extraction module may extract signal data from any image, including digital image 116. Without limitation, the signal extraction module may receive an image input and output a signal that may be used to feed downstream task models. In a non-limiting example, the signal extraction module may receive ECG image data as input and output ECG signal data, where the ECG signal data output may then be used by downstream task model(s). In a non-limiting example, augmented image 124 may be input into the signal extraction module, and the signal extraction module may output an ECG signal data. Without limitation, the signal extraction module may be trained using any image as input, including augmented image 124.

Still referring to FIG. 1, processor 104 trains machine learning model 136 using augmented image 124. Machine learning model 136 may include a neural network. As used in this disclosure, a "neural network" is a computational model consisting of interconnected nodes organized in layers as further discussed in FIGS. 13 and 14.

With continued reference to FIG. 1, wherein the neural network may include a universal or multi layout based neural network model. As used in this disclosure, a "universal based neural network" is a neural network that is designed to process one type of input signal. For instance, without limitation, a neural network that is designed to process images, text, audio, or time-series data. A universal based neural network is typically trained on a single type of data and is optimized for tasks relevant to that data type. As used in this disclosure, a "multi-layout based neural network" is a neural network capable of processing multiple types of input signals simultaneously. For example, and without limitation, a multi-layout based neural network may be capable of accepting both images and text inputs or multiple modalities of data.

With continued reference to FIG. 1, wherein the neural network is configured to receive a database may include extensible markup language formatted digital images, classify the database of extensible markup language formatted digital images, and generate the augmented image.

As used in this disclosure, a "database" is any data repository containing information.

As used in this disclosure, "extensible markup language formatted digital images" is a metalanguage which allows users to define customized markup languages. Typically, without limitation, extensible markup language (XML) is used to create formats for data that is used to encode information for documentation, database records, transactions, and other types of data. In a non-limiting example, XML is serialized (e.g., storing, transmitting, and reconstructing arbitrary data). In order to for two disparate systems to exchange information, a unified file format must be used, thus, XML provides a standardized file format to make such exchanges.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
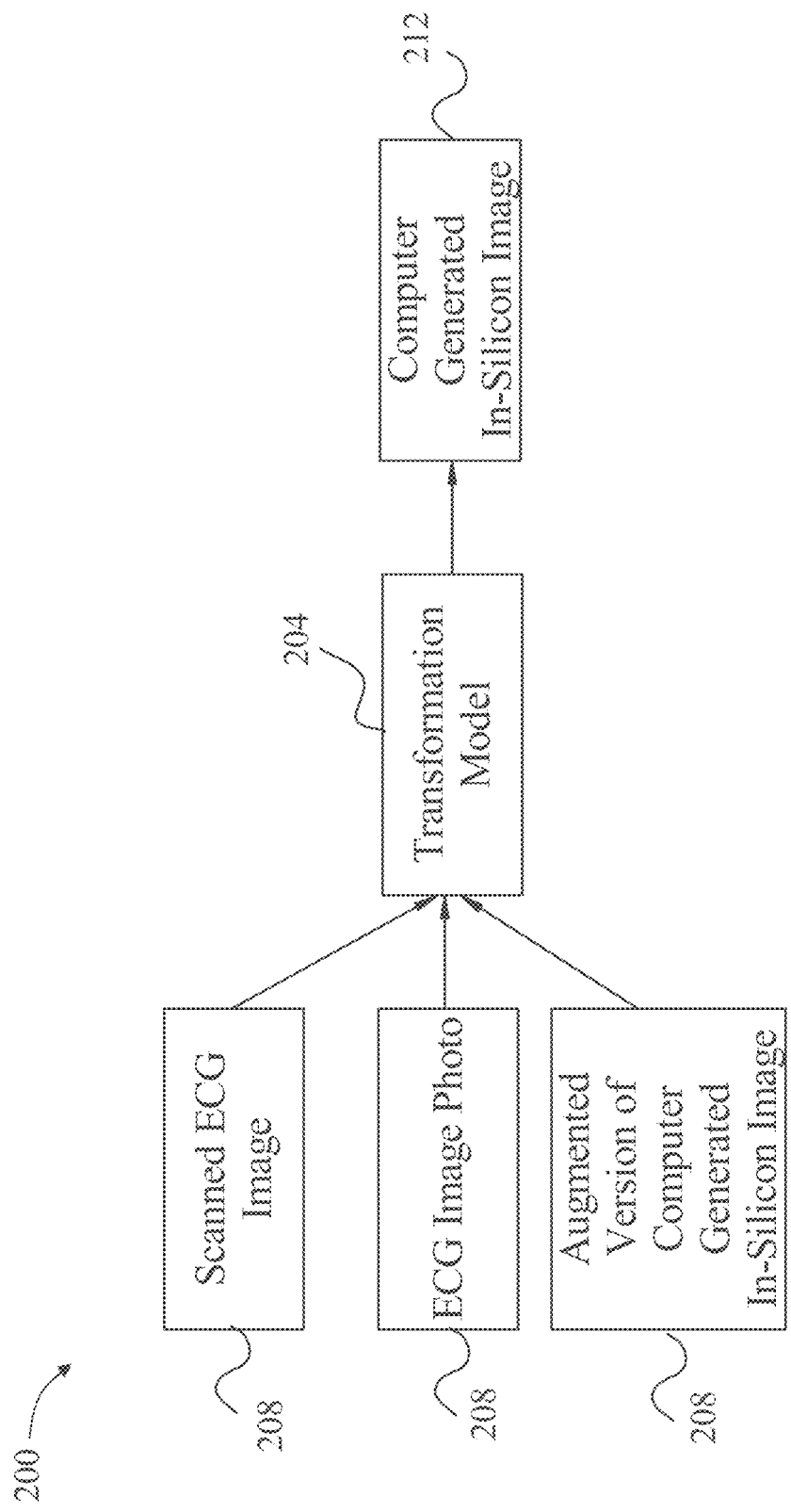
FIG. 2 is a diagram of an exemplary embodiment of a system for transforming images in accordance with the subject disclosure.

Referring now to FIG. 2, an exemplary embodiments of a system 200 for transforming images is described. In one or more embodiments, system include a transformation model 204 is described. In one or more embodiments, transformation model 204 may include ECG transformation model as described above. In one or more embodiments, inputs 208 into transformation model 204 may include inputs 208 such as scanned ECG images, ECG images photos taken by a camera and/or augmented versions of computer generated images. Transformation model 204 may receive inputs and generate outputs 212. In one or more embodiments, outputs may include standardized images as described above. In one or more embodiments, outputs may include computer generated-in silicon images. Transformation model 204 may be trained by taking in either augmented version of computer generated in-silicon images or photo/scanned copy of printed ECG or screenshot of ECG as input and would be optimized to produce a pristine computer generated in-silicon quality image as described in reference to FIG. 1. The transformation model 204 would output the same layout as the input layout. transformation model 204 may include a convolutional neural networks or transformer based neural networks or a combination of both. In one or more embodiments, transformation model 204 may include a Pix2Pix model, wherein the Pix2Pix model is a generative adversarial network that allows for image to image translation. In one or more embodiments, Pix2Pix model may be trained by taking in either augmented version of computer generated in-silicon images or photo/scanned copy of printed ECG signals such as ECG image as described above or screenshot of ECG as input and would be optimized to produce a pristine computer generated in-silicon quality image such as EG visual data as described above. In one or more embodiments, Pix2Pix model may be trained to map input images from one domain such as ECG images to output images in another domain, such as ECG visual data. In one or more embodiments, Pix2Pix model may be trained using a data set of ECG images correlated to ECG visual data as described above. IN one or more embodiments, Pix2Pix model may be trained to receive images of ECG signals associated with patients and generate in-silicon images which may be used by one or more machine learning models as described in this disclosure. In a non-limiting example, transformation model 204, may be the same or substantially the same as the transformation model described in U.S. patent application Ser. No. 18/641,217, filed on Apr. 19, 2024, titled "SYSTEMS AND METHODS FOR TRANSFORMING ELECTROCARDIOGRAM IMAGES FOR USE IN ONE OR MORE MACHINE LEARNING MODELS," which is incorporated by reference herein in its entirety.

Figure 3:
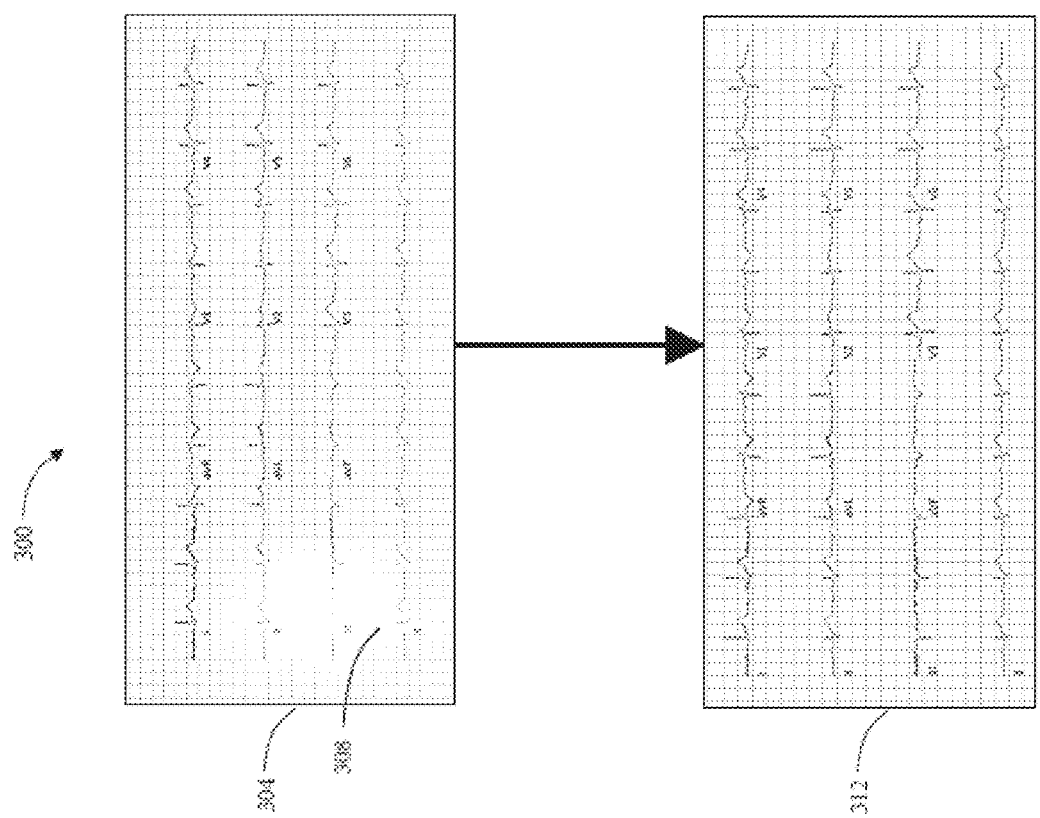
FIG. 3 is a diagram of an exemplary process of transforming images of ECG signals in accordance with the subject disclosure.

Referring now to FIG. 3, an exemplary process 300 of transforming images of ECG signals is described. In one or more embodiments, process 300 may include receiving an input image 304. In one or more embodiments, input image 304 may include an image taken by a camera, a scanner and the like. As illustrated in FIG. 3, input image 304 may contain deformities 308 that may cause issues with processing input image 304. In one or more embodiments, input image 304 may include ECG image data and/or non-conforming data as described in reference to FIG. 1. In one or more embodiments, input image 304 may include a 3×4 with 1 Rhythm lead layout wherein the input image 304 depict 3 leads placed across 4 rows with one additional lead dedicated to displaying rhythm. In one or more embodiments, process 300 may include the use of a transformation model such as ECG transformation model, as discussed in FIG. 2, to convert input image 304 into output image 312. In one or more embodiments, output image 312 may include a computer generated image of ECG signals. In one or more embodiments, output image may include a 3×4 with 1 Rhythm lead layout similar to that of input image 304. In one or more embodiments, corrections to an image with an ECG signal may be made without modifying the original ECG signal being depicted. In one or more embodiments, output image 312 may include a computer generated in-silicon image. In one or more embodiments, output image may now be used within ECG machine learning model as described above in order to generate a diagnostic output. In one or more embodiments, output image may include standardized image as described above. In one or more embodiments, output image 312 may include an image that may be contained within standardized data as described above. In one or more embodiments, process 300 may depict a transformation process in which a non-conforming image has been converted into a standardized image.

Figure 4:
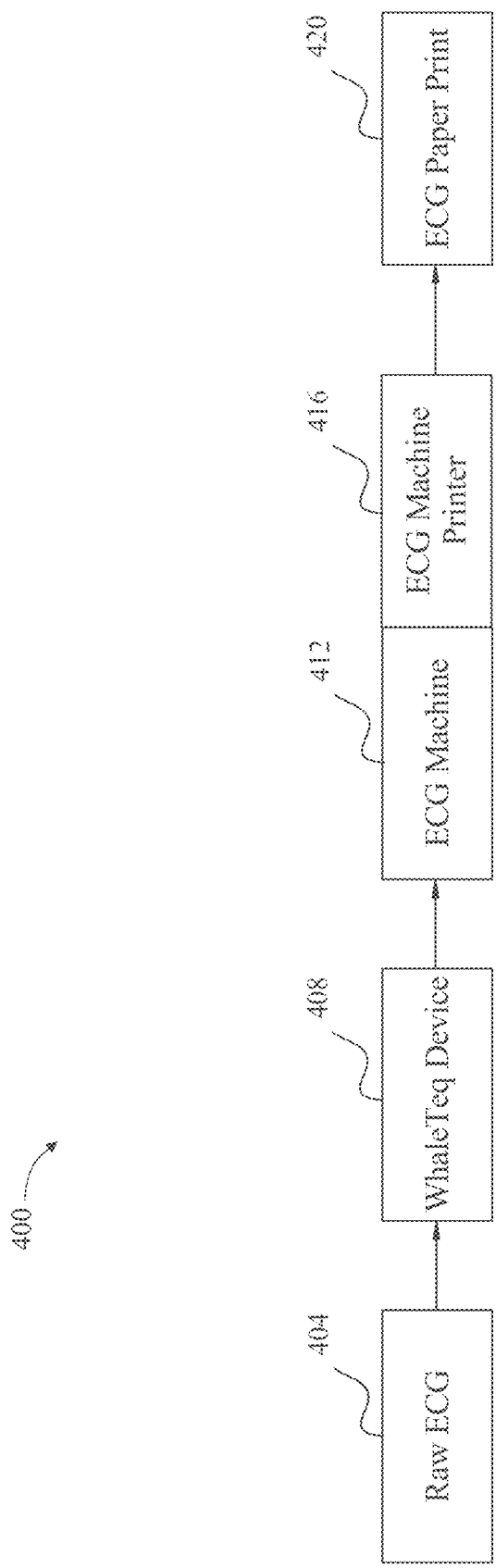
FIG. 4 is a diagram of an exemplary embodiment of a system for producing a paper print using an ECG machine in accordance with the subject disclosure.

Referring now to FIG. 4, an exemplary embodiments of a system 400 for producing a paper print using an ECG machine is described. In one or more embodiments, system 400 may include raw ECG data 404 is described. In one or more embodiments, system 400 may include WhaleTeq Device 408 as described herein. As used in this disclosure, a "WhaleTeq Device" is equipment specifically designed for evaluating ECG signals. In one or more embodiments, system 400 may include ECG Machine 412 as described herein. As used in this disclosure, an "ECG machine" is equipment used to record the electrical activity of the heart over a period of time. In one or more embodiments, ECG machine 412 may include inputs such as raw ECG data 404 as a function of WhaleTeq Device 408. In one or more embodiments, ECG machine 412 includes ECG machine printer 416. As used in this disclosure, an "ECG machine printer" is a component of an ECG machine responsible for producing a physical copy of the ECG tracing. In one or more embodiments, ECG machine printer 416 may produce a paper print of the waveform in real-time or after the ECG recording is completed by ECG machine 412.

Figure 5:
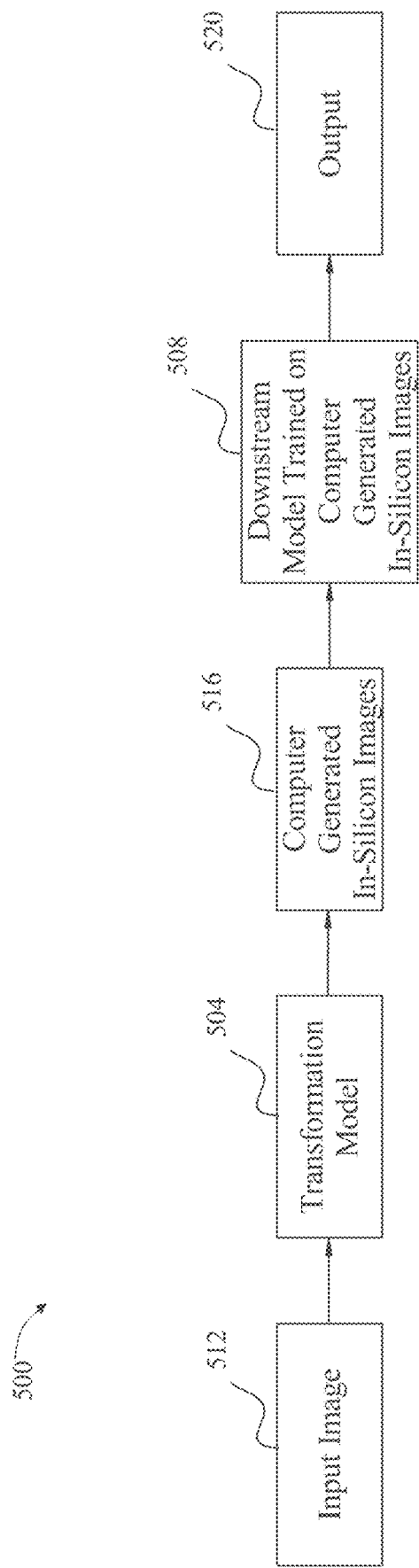
FIG. 5 is a diagram of an exemplary embodiment of a system for using transformation model in downstream tasks in accordance with the subject disclosure.
Figure 11:
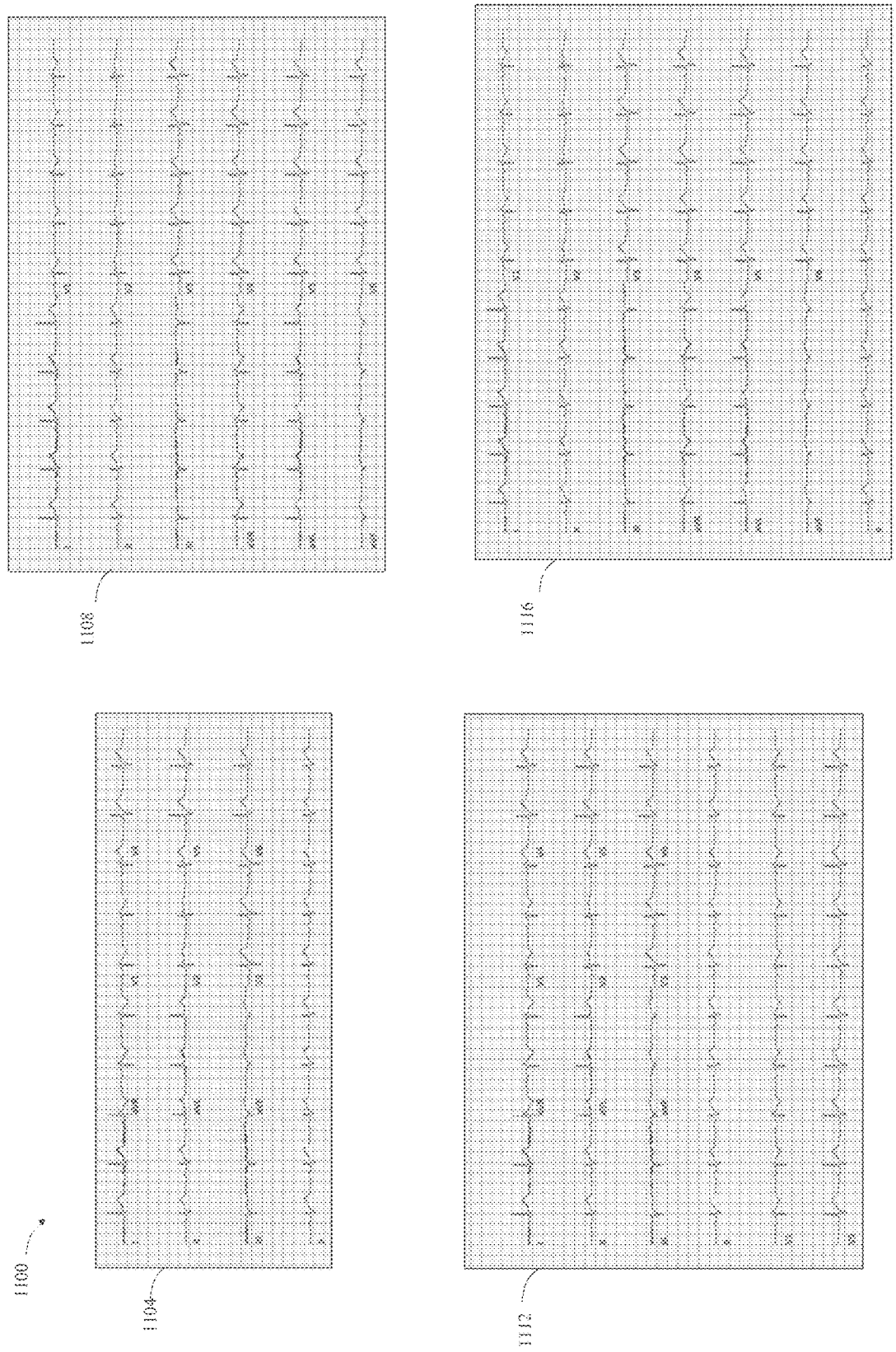
FIG. 11 is a depiction of an exemplary embodiment of different ECG layouts in accordance with the subject disclosure.

Referring now to FIG. 5, an exemplary embodiments of a system 500 for using transformation model 504 in downstream task model 508 is described. In one or more embodiments, system 500 may include transformation model 504, as previously mentioned in FIG. 2. As used in this disclosure, a "transformation model" is a component designed to convert ECG images coming from different sources and of different quality into computer generated quality image and then feed it to a downstream task model 508, where the downstream task model 508 is further described in FIG. 6. In one or more embodiments, transformation model 504 may include inputs such as input image 512. As used in this disclosure, an "input image" may include any image. In one or more embodiments, input image 512 may include images from a scanner, a camera photo, and the like. In a non-limiting example, input image 512 may include an ECG image, an augmented ECG image, and the like. In one or more embodiments, transformation model 504 may include outputs such as computer generated in-silicon images 516. In one or more embodiments, downstream task model 508 may include inputs such as computer generated in-silicon images 516. In one or more embodiments, downstream task model 508 may include outputs such as output 520. In one or more embodiments, transformation model may be trained using ECG layouts and/or paired data. In one or more embodiments, ECG layouts may include ECG prints or ECG exported to PDF in different layout and with different settings, such as, without limitation, layouts including: 3×4, 3×4 with 1 Rhythm lead, 6×2, 6×2 with 1 Rhythm lead, 12×1, 3×4 with 2 Rhythm leads, 3×4 with 3 Rhythm leads, Pan12 layout (as shown in FIG. 11), and the like; and with settings including: with paper speed of 25 mm/s or 50 mm/s, with limb lead scale of 2.5 mm/mV, 5 mm/mV, 10 mm/mV, 20 mm/mV, with full scale chest leads and half scale chest leads, time sequential versus simultaneous, standard and Cabrera format, with reference signal at end, or with reference signal at start or no reference signal, with separator between lead signals or without separator between lead signals, and the like. In one or more embodiments, transformation model may be used in downstream deployment pipelines, where the downstream task models 508 can be trained using computer generated in-silicon images. In one or more embodiments, this eliminates the need for having different quality ECG images in the dataset for every downstream task model 508 for the purpose of training.

Figure 6:
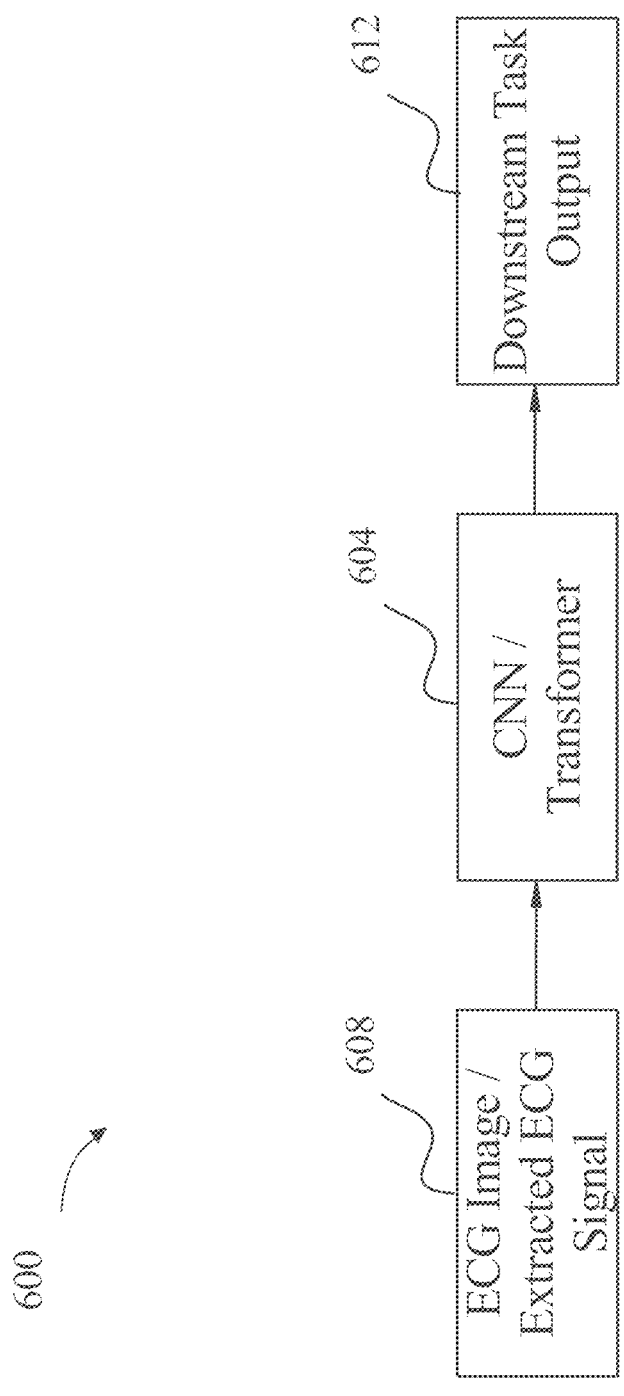
FIG. 6 is a diagram of an exemplary embodiment of a system for training multiple downstream task models in accordance with the subject disclosure.

Referring now to FIG. 6, an exemplary embodiments of a system 600 for training multiple downstream task models 604. In one or more embodiments, downstream task model 604 may include, without limitation, models for disease prediction (e.g., classification model binary or multiclass), parameter extraction (e.g., regression model to predict the ECG parameters like PR interval, ventricular rate, QT interval etc.), ECG delineation (e.g., segmentation model to segment ECG signal into P, QRS, T, U waves etc.), ECG rhythm and abnormalities prediction (e.g., multiclass classification model to predict various abnormalities in ECG like rhythm/rhythm abnormalities, conduction abnormalities, morphological abnormalities, etc.), ECG text report generation (e.g., auto-regressive model to generate ECG text report), monitoring applications (e.g., classification, regression etc. based on pairs of ECGs from the same patient), prediction of mechanical and anatomical parameters related to the heart (e.g., EF, LVMI, filling pressures, etc., volume and surface areas of each of the chambers, #PVs, width/diameter of valves and important vessels, vascular pressures). In one or more embodiments, system 600 may include ECG images and/or extracted ECG signal data 608. In one or more embodiments, ECG images and/or extracted ECG signal data 608 may be used as training data for multiple downstream task models 604. In one or more embodiments, multiple downstream task models 604 may output downstream task output 612.

With continued reference to FIG. 6, in one or more embodiments, downstream task models 604 is trained and deployed using two approaches as illustrated by ECG Image/Extracted ECG Signal 608. In one or more embodiments, downstream task models 604 is trained and deployed using an image as input, as further discussed in FIG. 7. Without limitation, ECG image 608 may include augmented image from FIG. 1. In one or more embodiments, downstream task models 604 is trained and deployed using extracted signal as input, as discussed in FIG. 8 and FIG. 9. In one or more embodiments, downstream task models 604 may include a convolutional neural network and/or a transformer.

Figure 7:
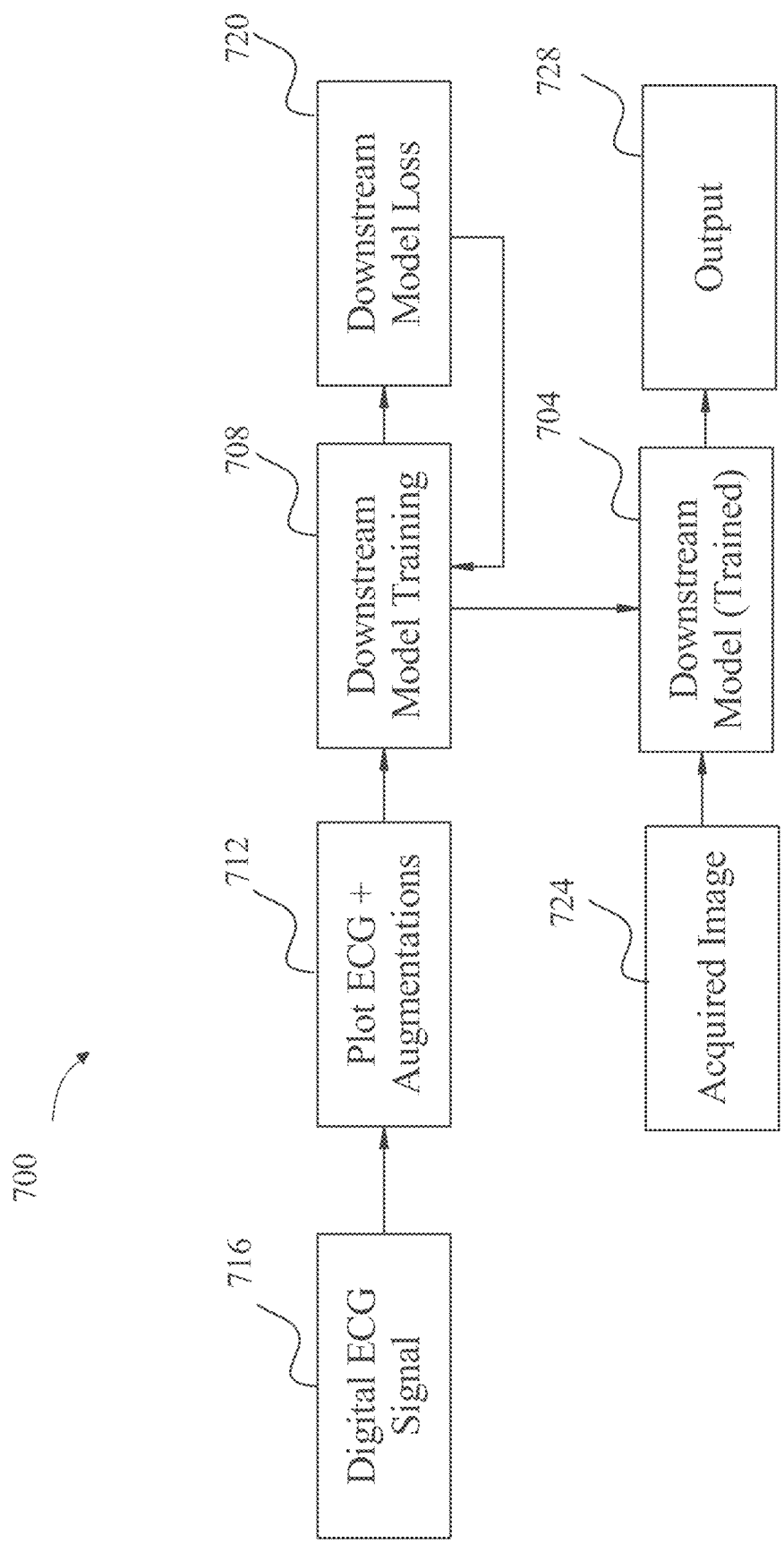
FIG. 7 is a diagram of an exemplary embodiment of a system for training downstream model in accordance with the subject disclosure.

Referring now to FIG. 7, an exemplary embodiments of a system 700 for training downstream model 704. In one or more embodiments, downstream model 704 may be consistent with the downstream task models as described in FIG. 6. In one or more embodiments, downstream model training 708 may include plotting ECG data and augmentations 712, wherein plotted ECG data and augmentations include digital ECG signal 716. As used in this disclosure, plotting ECG data and augmentations 712 may be the same or substantially the same In one or more embodiments, downstream model training 708 may output downstream model loss 720, wherein downstream model loss 720 may be used as input to downstream model training 708. In one or more embodiments, downstream model 704 may include input, such as acquired image 724, such as images captured using scanner, mobile or standalone camera, without any augmentations. In one or more embodiments, downstream model 704 may generate output 728.

Figure 8:
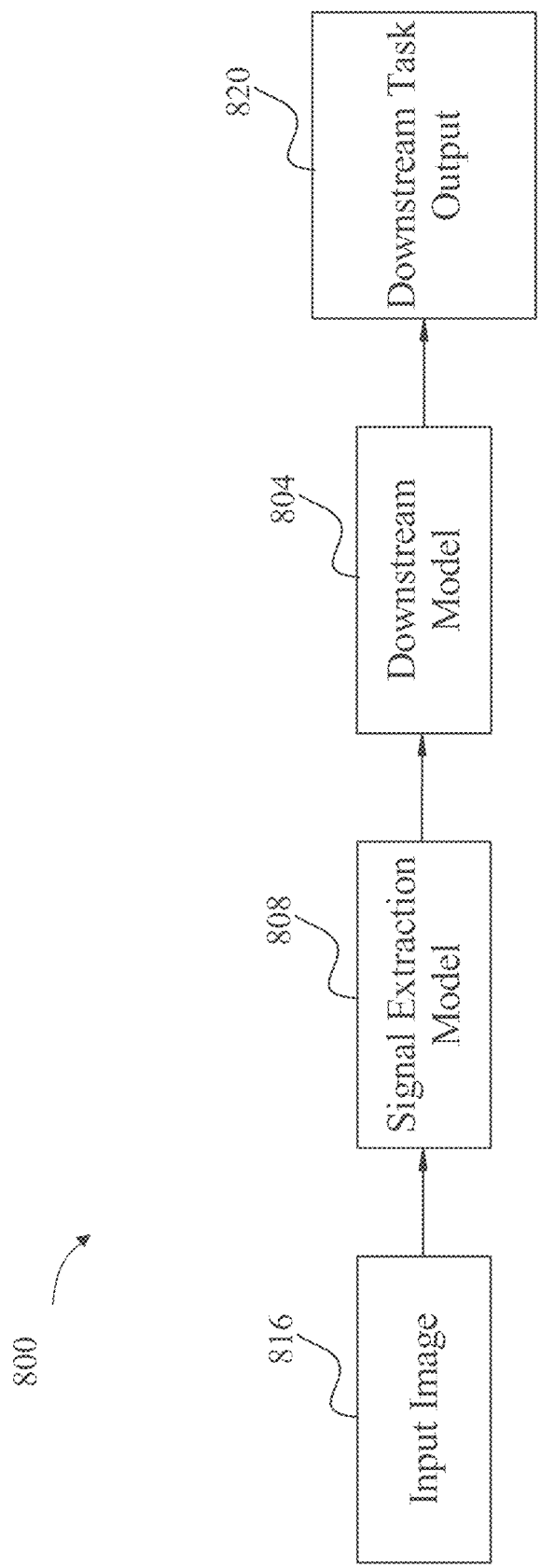
FIG. 8 is a diagram of an exemplary embodiment of a system for training downstream model using signal extraction model in accordance with the subject disclosure.

Referring now to FIG. 8, an exemplary embodiments of a system 800 for training downstream model 804 using signal extraction model 808. In one or more embodiments, signal extraction model includes input image 816. In one or more embodiments, downstream model 804 outputs downstream task output 820. In one or more embodiments, signal extraction model 808 plots, using raw digital signals, training images. In one or more embodiments, signal extraction model 808 adds augmentation processing to signal and image data as described in FIG. 1. In one or more embodiments, signal extraction model 808 is trained to extract a signal mask. In one or more embodiments, signal extraction model 808 passes input image 816, during inference, to get the signal mask. In one or more embodiments, signal extraction model 808 uses computer vision to extract signal voltages time-series from the mask.

Figure 9:
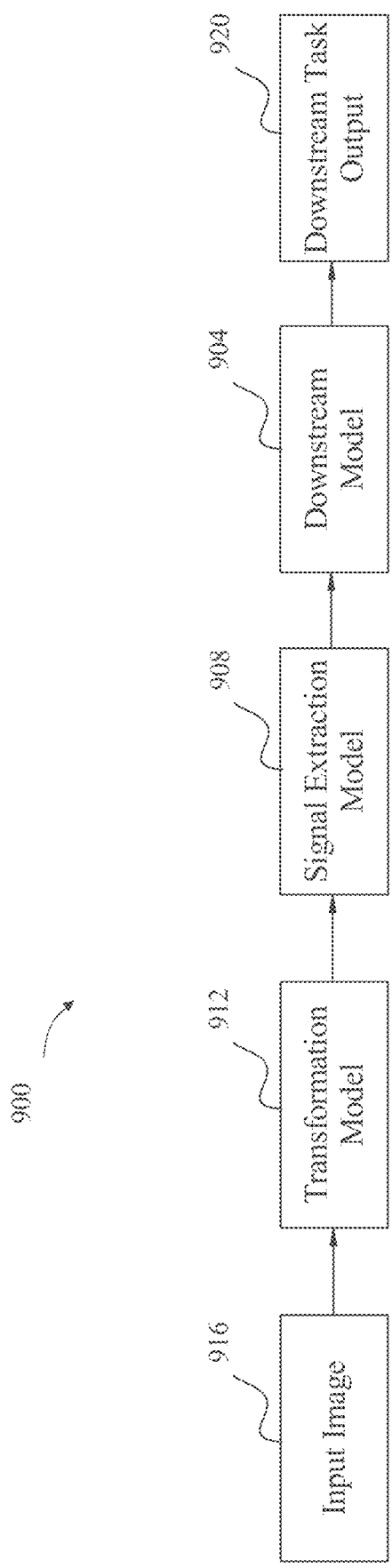
FIG. 9 is a diagram of an exemplary embodiment of a system for training downstream model using a signal extraction model and transformation model in accordance with the subject disclosure.

Referring now to FIG. 9, an exemplary embodiments of a system 900 for downstream model 904 to use signal extraction model 908, transformation model 912, and input image 916 to generate downstream task 920. In one or more embodiments, transformation model 912 receives input image 916 as input, and outputs a transformed image to signal extraction model 908. In one or more embodiments, signal extraction model 908 receives the transformed image from transformation model 912 and outputs a signal to be fed to downstream model 904. In one or more embodiments, downstream model 904 receives signal input from signal extraction model 908 and generates an output, downstream task output 920. In one or more embodiments, system 900 represents a deployment pipeline for downstream model 904 using extracted signal from a transformed image.

Figure 10:
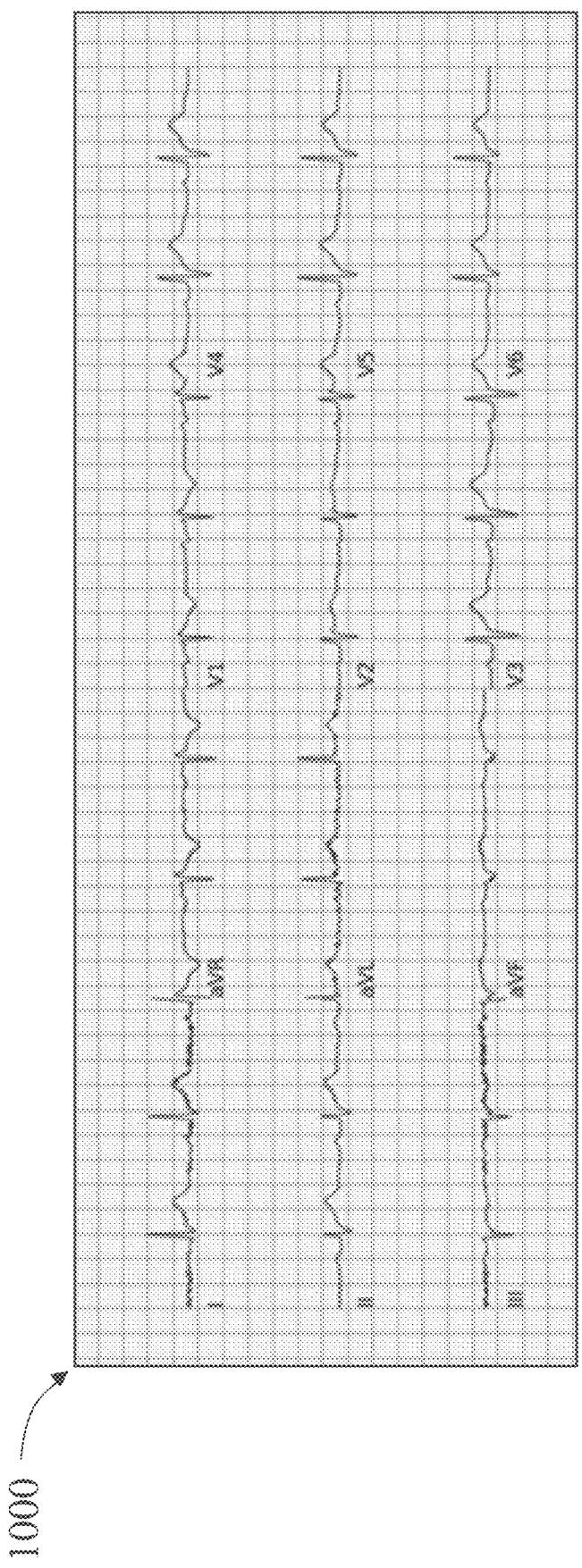
FIG. 10 is a depiction an exemplary embodiment of a computer generated in-silicon ECG image in accordance with the subject disclosure.

Referring now to FIG. 10, an exemplary embodiments of a computer generated in-silicon ECG image 1000. In one or more embodiments, computer generated in-silicon ECG image 1000 may be generated using one or more transformation models. In one or more embodiments, computer generated in-silicon ECG image 1000 is a quality image as compared to input ECG image.

Referring now to FIG. 11, an exemplary embodiments of different ECG layouts 1100. In one or more embodiments, ECG layout 1100 may include a 3×4 with 1 Rhythm lead layout 1104. In one or more embodiments, the 3×4 with 1 Rhythm lead layout 1104 refers to the standard 12-lead ECG system, which consists of 12 different views of the heart's electrical activity where each lead provides unique information about the heart's electrical conduction from a specific angle or perspective. In one or more embodiments, the 3×4 indicates the arrangement of 4 leads which is presented in a grid format with 3 rows and 4 columns as illustrated in the 3×4 with 1 Rhythm lead layout 1104. In one or more embodiments, the 1 Rhythm lead indicates the bottom wave where a single lead trace is given for the duration of the data collection. In one or more embodiments, ECG layout 1100 may include a 6×2 with no Rhythm leads layout 1108. In one or more embodiments, the 6×2 indicates the arrangement of 6 leads which is presented in a grid format with 6 rows and 2 columns as illustrated in the 6×2 with no Rhythm lead layout 1108. In one or more embodiments, ECG layout 1100 may include a 3×4 with 3 Rhythm leads layout 1112. In one or more embodiments, the 3×4 indicates the arrangement of 4 leads which is presented in a grid format with 3 rows and 4 columns as illustrated in the 3×4 with 3 Rhythm leads layout 1112. In one or more embodiments, the 3 Rhythm leads indicate the bottom wave where there are three single lead traces given for the duration of the data collection. In one or more embodiments, ECG layout 1100 may include a 6×2 with 1 Rhythm lead layout 1116. In one or more embodiments, the 6×2 indicates the arrangement of 6 leads which is presented in a grid format with 6 rows and 2 columns as illustrated in the 6×2 with 1 Rhythm lead layout 1116. In one or more embodiments, the 1 Rhythm lead indicates the bottom wave where a single lead trace is given for the duration of the data collection.

With continued reference to FIG. 11, in one or more embodiments, the typical duration for a standard 12-lead ECG recording is a few seconds, generally from 10 to 30 seconds. In one or more embodiments, each segment of the 12-lead ECG recording may represent approximately 1 second of the ECG tracing. In one or more embodiments, leads 1-3 may correspond to approximately 1 to 3 seconds into the ECG recording, wherein lead 1 represents the first second and lead 3 represents the third second. In one or more embodiments, leads 4-6 may correspond to approximately 4 to 6 seconds into the ECG recording, wherein lead 4 represents the fourth second and lead 6 represents the sixth second. In one or more embodiments, leads 7-9 may correspond to approximately 7 to 9 seconds into the ECG recording, wherein lead 7 represents the seventh second and lead 9 represents the ninth second. In one or more embodiments, leads 10-12 may correspond to approximately 10 to 12 seconds into the ECG recording, wherein lead 10 represents the tenth second and lead 12 represents the twelfth second.

Figure 12:
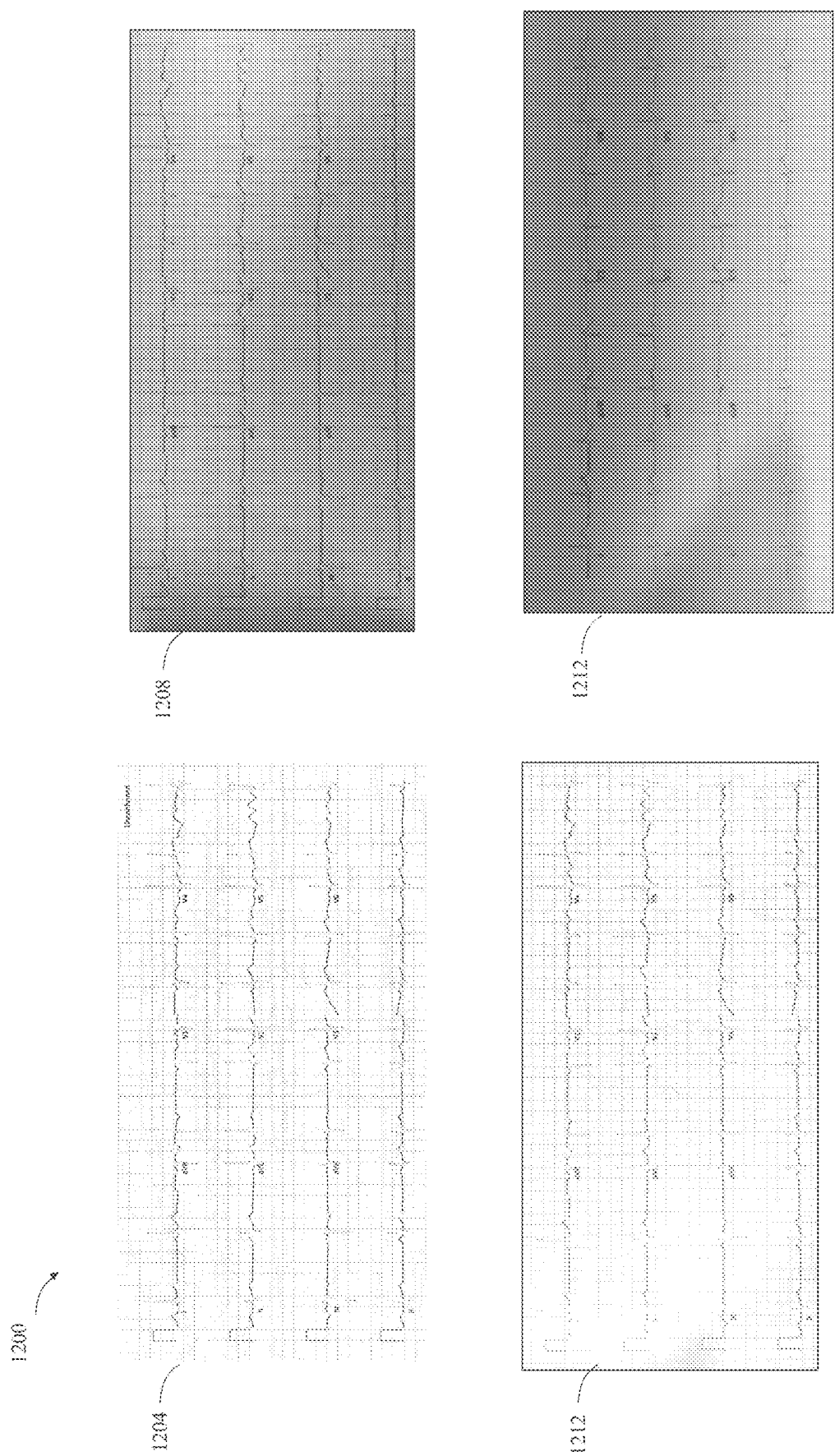
FIG. 12 is a depiction of an exemplary embodiment of ECG images captured using scanner, camera, and/or applied augmentations.

Referring now to FIG. 12, an exemplary embodiments of ECG images captured using scanner, camera, and applied augmentations 1200. In one or more embodiments, ECG images captured using scanner, camera, and applied augmentations 1200 may include scanner captured ECG image 1204. In one or more embodiments, ECG images captured using scanner, camera, and applied augmentations 1200 may include camera captured ECG image 1208. In one or more embodiments, ECG images captured using scanner, camera, and applied augmentations 1200 may include ECG image with applied augmentation 1212.

Figure 13:
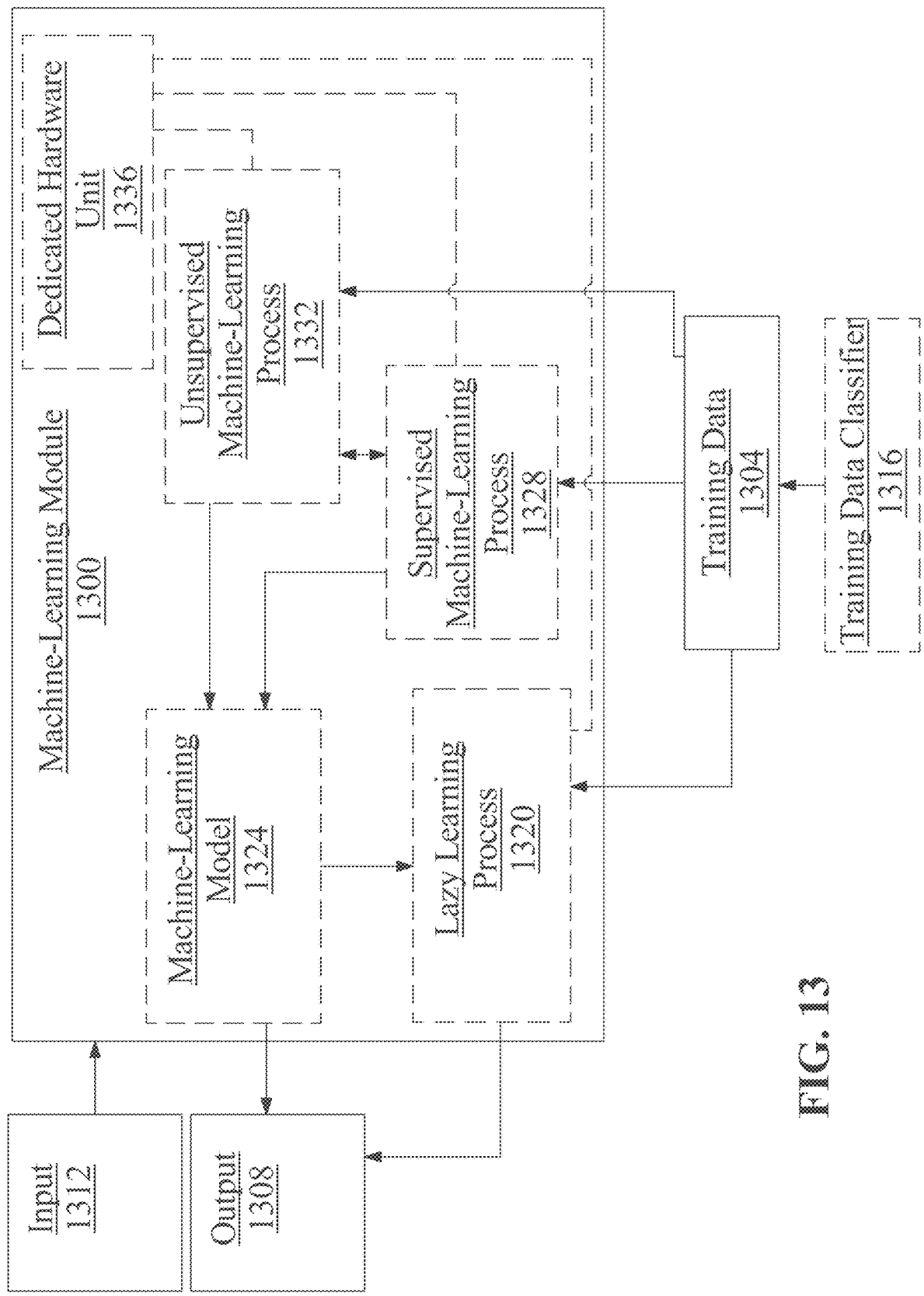
FIG. 13 is a block diagram of an exemplary machine-learning process.

Referring now to FIG. 13, an exemplary embodiments of a machine-learning module 1300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1304 to generate an algorithm instantiated in hardware or software logic, data structures, and/or functions that will be performed by a computing device/module to produce outputs 1308 given data provided as inputs 1312; this is in contrast to a non-machine learning software program where the commands to be executed are determined in advance by a user and written in a programming language.

Still referring to FIG. 13, "training data," as used herein, is data containing correlations that a machine-learning process may use to model relationships between two or more categories of data elements. For instance, and without limitation, training data 1304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 1304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1304 according to various correlations; correlations may indicate causative and/or predictive links between categories of data elements, which may be modeled as relationships such as mathematical relationships by machine-learning processes as described in further detail below. Training data 1304 may be formatted and/or organized by categories of data elements, for instance by associating data elements with one or more descriptors corresponding to categories of data elements. As a non-limiting example, training data 1304 may include data entered in standardized forms by persons or processes, such that entry of a given data element in a given field in a form may be mapped to one or more descriptors of categories. Elements in training data 1304 may be linked to descriptors of categories by tags, tokens, or other data elements; for instance, and without limitation, training data 1304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 13, training data 1304 may include one or more elements that are not categorized; that is, training data 1304 may not be formatted or contain descriptors for some elements of data. Machine-learning algorithms and/or other processes may sort training data 1304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1304 to be made applicable for two or more distinct machine-learning algorithms as described in further detail below. Training data 1304 used by machine-learning module 1300 may correlate any input data as described in this disclosure to any output data as described in this disclosure. As a non-limiting illustrative signal data and/or image data, (e.g., ECG raw signal data and/or ECG digital image) and augmented image (e.g., simulated scan image).

Further referring to FIG. 13, training data may be filtered, sorted, and/or selected using one or more supervised and/or unsupervised machine-learning processes and/or models as described in further detail below; such models may include without limitation a training data classifier 1316. Training data classifier 1316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 1300 may generate a classifier using a classification algorithm, defined as a processes whereby a computing device and/or any module and/or component operating thereon derives a classifier from training data 1304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1316 may classify elements of training data to distinguish between signal data or image data.

Still referring to FIG. 13, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 13, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 13, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where ai is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 13, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 13, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 13, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 13, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 13, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 13, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 13, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 13, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the 25th percentile value and the 50th percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 13, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 13, machine-learning module 1300 may be configured to perform a lazy-learning process 1320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1304. Heuristic may include selecting some number of highest-ranking associations and/or training data 1304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 13, machine-learning processes as described in this disclosure may be used to generate machine-learning models 1324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 1324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1324 may be generated by creating an artificial neural network, such as a convolutional neural network comprising an input layer of nodes, one or more intermediate layers, and an output layer of nodes. Connections between nodes may be created via the process of "training" the network, in which elements from a training data 1304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 13, machine-learning algorithms may include at least a supervised machine-learning process 1328. At least a supervised machine-learning process 1328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs, as described in this disclosure, as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1304. Persons skilled in the art, upon reviewing the entirety of this disclosure, will be aware of various possible variations of at least a supervised machine-learning process 1328 that may be used to determine relation between inputs and outputs. Supervised machine-learning processes may include classification algorithms as defined above.

With further reference to FIG. 13, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 13, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 13, machine learning processes may include at least an unsupervised machine-learning processes 1332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 1332 may not require a response variable; unsupervised processes 1332 may be used to find interesting patterns and/or inferences between variables, to determine a degree of correlation between two or more variables, or the like.

Still referring to FIG. 13, machine-learning module 1300 may be designed and configured to create a machine-learning model 1324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiments to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 13, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 13, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 13, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 13, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 13, one or more processes or algorithms described above may be performed by at least a dedicated hardware unit 1336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 1336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 1336 may include, without limitation, graphical processing units (GPUs), dedicated signal processing modules, FPGA or other reconfigurable hardware that has been configured to instantiate parallel processing units for one or more specific tasks, or the like. A computing device, processor, apparatus, or module may be configured to instruct one or more dedicated hardware units 1336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 14:
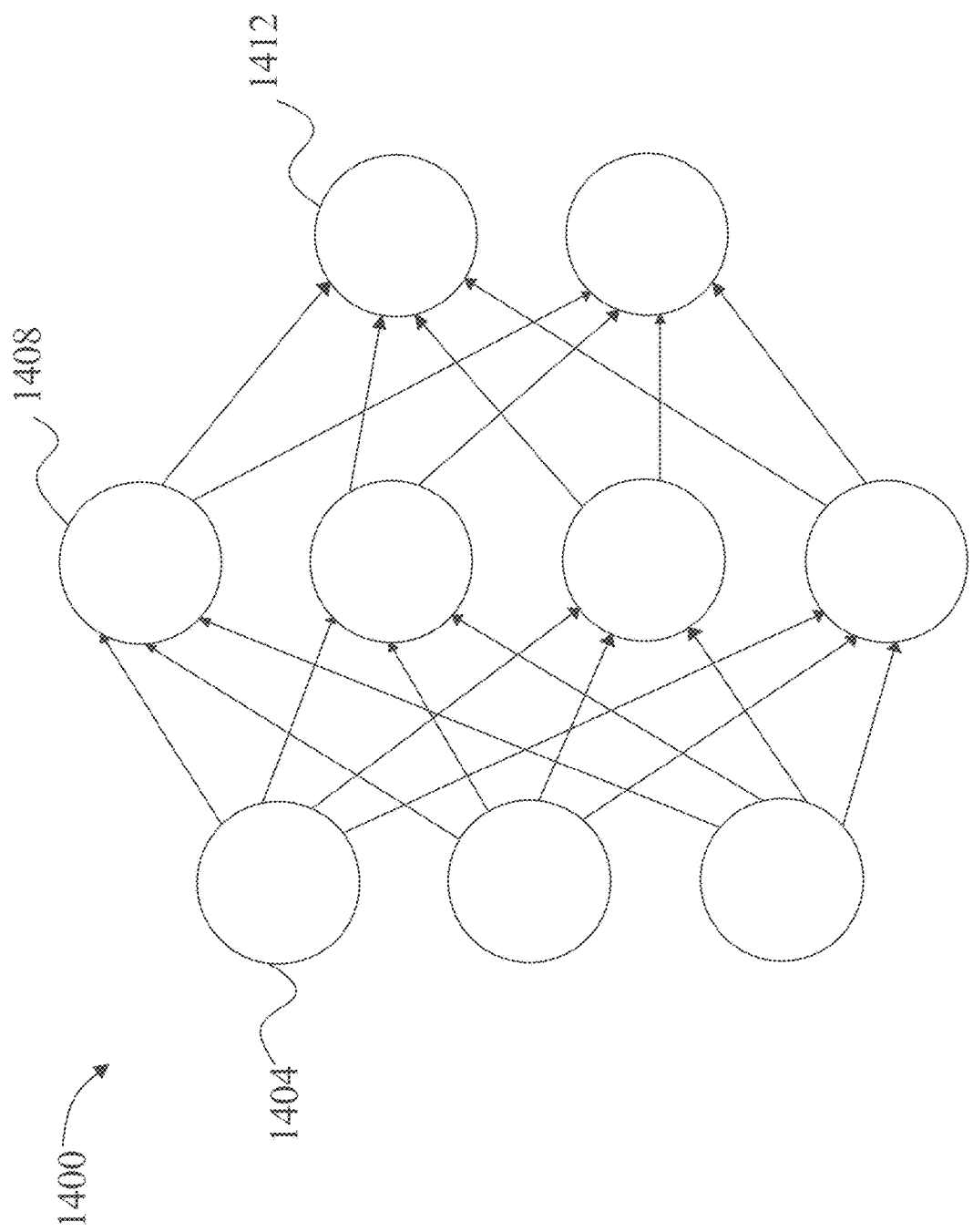
FIG. 14 is a diagram of an exemplary embodiment of a neural network.

Referring now to FIG. 14, an exemplary embodiments of neural network 1400 is illustrated. A neural network 1400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 1404, one or more intermediate layers 1408, and an output layer of nodes 1412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 15:
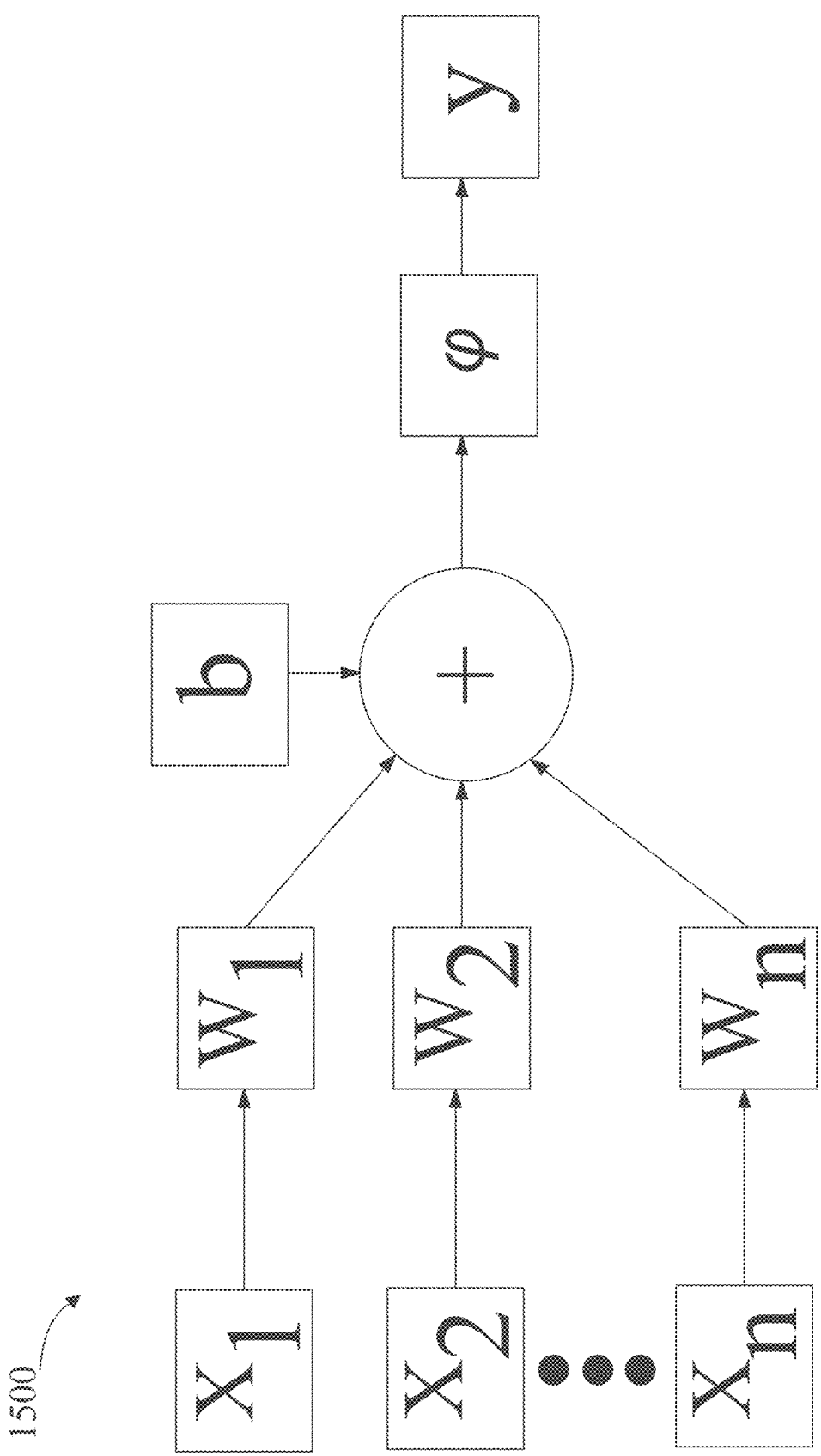
FIG. 15 is a diagram of an exemplary embodiment of a node of a neural network.

Referring now to FIG. 15, an exemplary embodiments of a node 1500 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs xi that may be used as activation functions. As a non-limiting and illustrative example, node may perform a weighted sum of inputs using weights wi that are multiplied by respective inputs xi. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

Figure 16:
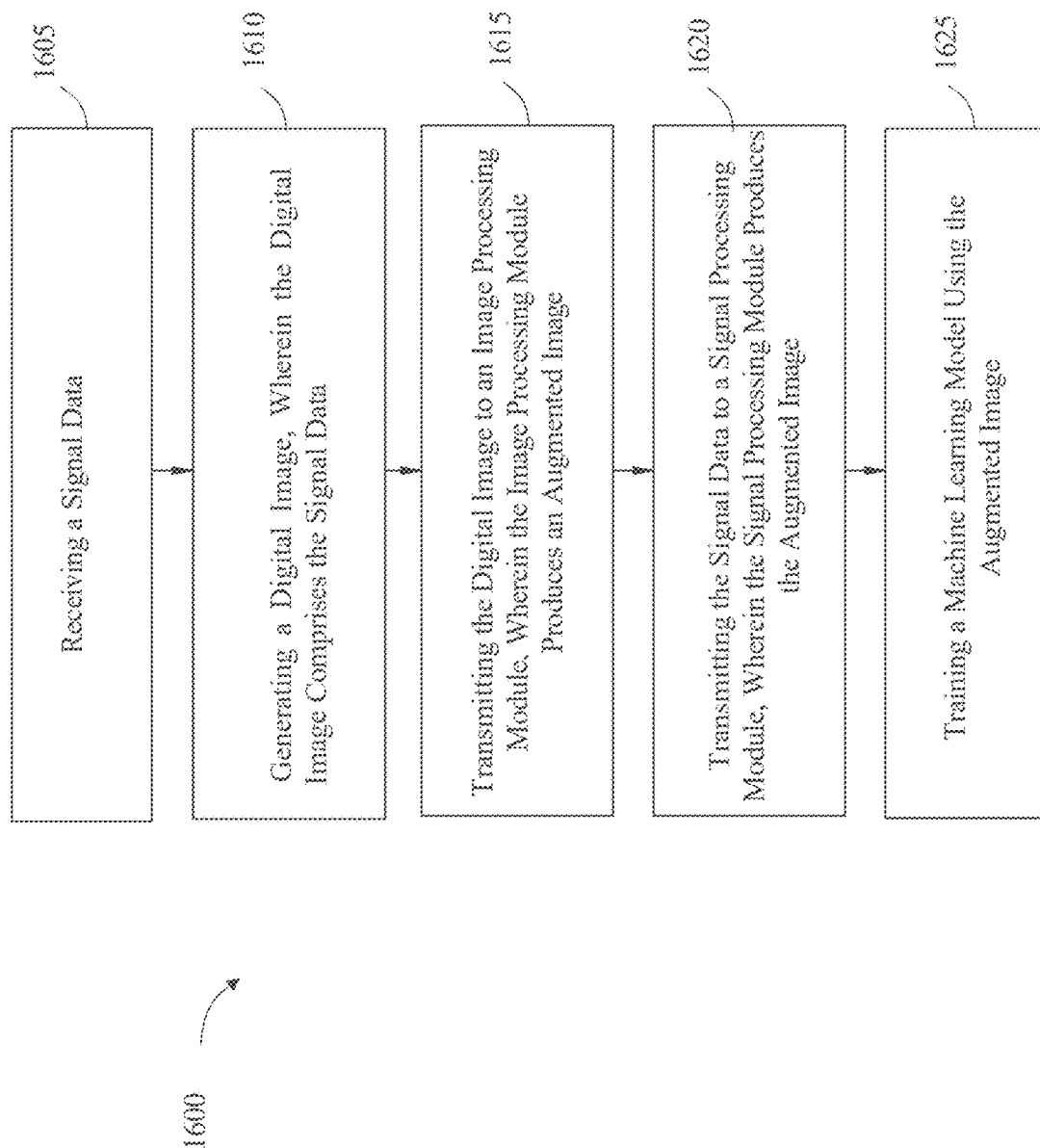
FIG. 16 is a block diagram of an exemplary method for training a machine learning model to augment signal data and image data.

Referring now to FIG. 16, a flow diagram of an exemplary method 1600 for training a machine learning model to augment signal data and image data is illustrated. At step 1605, method 1600 includes receiving, using at least a processor, a signal data. This may be implemented as described and with reference to FIGS. 1-15.

Still referring to FIG. 16, at step 1610, method 1600 includes generating, using at least a processor, a digital image, wherein the digital image comprises the signal data. This may be implemented as described and with reference to FIGS. 1-15.

Still referring to FIG. 16, at step 1615, method 1600 includes transmitting, using at least a processor, the digital image to an image processing module, wherein the image processing module produces an augmented image. This may be implemented as described and with reference to FIGS. 1-15.

Still referring to FIG. 16, at step 1620, method 1600 includes transmitting, using at least a processor, the signal data to a signal processing module, wherein the signal processing module produces an augmented image. This may be implemented as described and with reference to FIGS. 1-15.

Still referring to FIG. 16, at step 1625, method 1600 includes training, using at least a processor, a machine learning model using the augmented image. This may be implemented as described and with reference to FIGS. 1-15.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 17:
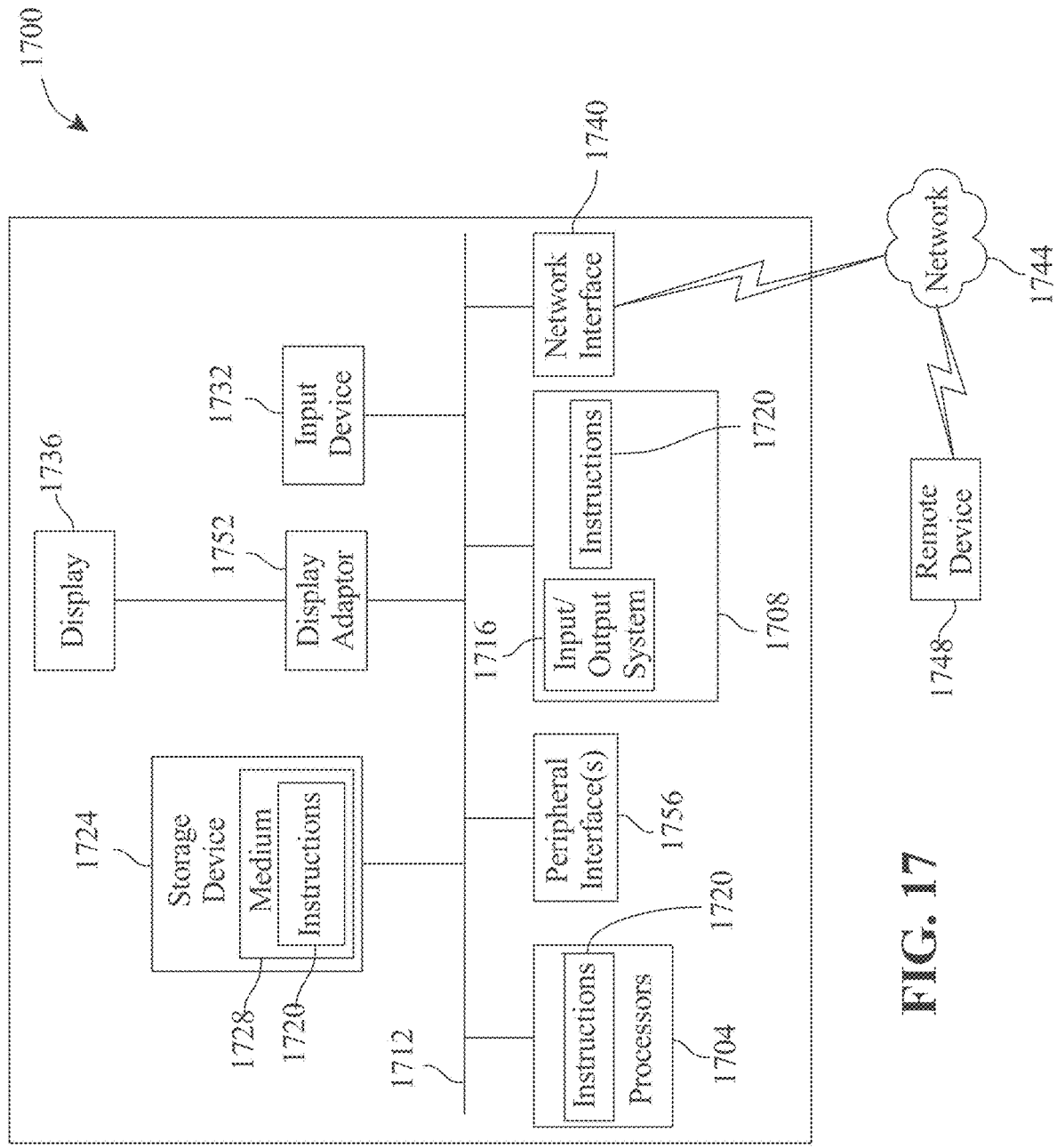
FIG. 17 is a block diagram of a computing system that can be used to implement any one or more of the methodologies disclosed herein and any one or more portions thereof.

FIG. 17 shows a diagrammatic representation of one embodiments of computing device in the exemplary form of a computer system 1700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1700 includes a processor 1704 and a memory 1708 that communicate with each other, and with other components, via a bus 1712. Bus 1712 may include any of several types of bus structures including, but not limited to, a memory bus, a memory controller, a peripheral bus, a local bus, and any combinations thereof, using any of a variety of bus architectures.

Processor 1704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1704 may be organized according to Von Neumann and/or Harvard architecture as a non-limiting example. Processor 1704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1708 may include various components (e.g., machine-readable media) including, but not limited to, a random-access memory component, a read only component, and any combinations thereof. In one example, a basic input/output system 1716 (BIOS), including basic routines that help to transfer information between elements within computer system 1700, such as during start-up, may be stored in memory 1708. Memory 1708 may also include (e.g., stored on one or more machine-readable media) instructions (e.g., software) 1720 embodying any one or more of the aspects and/or methodologies of the present disclosure. In another example, memory 1708 may further include any number of program modules including, but not limited to, an operating system, one or more application programs, other program modules, program data, and any combinations thereof.

Computer system 1700 may also include a storage device 1724. Examples of a storage device (e.g., storage device 1724) include, but are not limited to, a hard disk drive, a magnetic disk drive, an optical disc drive in combination with an optical medium, a solid-state memory device, and any combinations thereof. Storage device 1724 may be connected to bus 1712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1724 (or one or more components thereof) may be removably interfaced with computer system 1700 (e.g., via an external port connector (not shown)). Particularly, storage device 1724 and an associated machine-readable medium 1728 may provide nonvolatile and/or volatile storage of machine-readable instructions, data structures, program modules, and/or other data for computer system 1700. In one example, software 1720 may reside, completely or partially, within machine-readable medium 1728. In another example, software 1720 may reside, completely or partially, within processor 1704.

Computer system 1700 may also include an input device 1732. In one example, a user of computer system 1700 may enter commands and/or other information into computer system 1700 via input device 1732. Examples of an input device 1732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1732 may be interfaced to bus 1712 via any of a variety of interfaces (not shown) including, but not limited to, a serial interface, a parallel interface, a game port, a USB interface, a FIRE-WIRE interface, a direct interface to bus 1712, and any combinations thereof. Input device 1732 may include a touch screen interface that may be a part of or separate from display device 1736, discussed further below. Input device 1732 may be utilized as a user selection device for selecting one or more graphical representations in a graphical interface as described above.

A user may also input commands and/or other information to computer system 1700 via storage device 1724 (e.g., a removable disk drive, a flash drive, etc.) and/or network interface device 1740. A network interface device, such as network interface device 1740, may be utilized for connecting computer system 1700 to one or more of a variety of networks, such as network 1744, and one or more remote devices 1748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1744, may employ a wired and/or a wireless mode of communication. In general, any network topology may be used. Information (e.g., data, software 1720, etc.) may be communicated to and/or from computer system 1700 via network interface device 1740.

Computer system 1700 may further include a video display adapter 1752 for communicating a displayable image to a display device, such as display device 1736. Examples of a display device include, but are not limited to, a liquid crystal display (LCD), a cathode ray tube (CRT), a plasma display, a light emitting diode (LED) display, and any combinations thereof. Display adapter 1752 and display device 1736 may be utilized in combination with processor 1704 to provide graphical representations of aspects of the present disclosure. In addition to a display device, computer system 1700 may include one or more other peripheral output devices including, but not limited to, an audio speaker, a printer, and any combinations thereof. Such peripheral output devices may be connected to bus 1712 via a peripheral interface 1756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed:

1. An apparatus for training a machine learning model to augment signal data and image data, the apparatus comprising:

at least a processor; and a memory communicatively connected to the at least a processor, the memory containing instructions configuring the at least a processor to:

receive signal data;
generate a digital image, wherein the digital image comprises the signal data;
transmit the digital image to an image processing module, wherein the image processing module produces a first augmented image;
transmit the signal data to a signal processing module, wherein the signal processing module produces a second augmented image; and
train a machine learning model using the first augmented image and the second augmented image as inputs and a computer generated image of the signal data as outputs.

2. The apparatus of claim 1, wherein generating the digital image comprises generating the digital image by processing the signal data and wherein processing the signal data comprises:
mapping the signal data to pixel values of the digital image; and
plotting the signal data to an image canvas.

3. The apparatus of claim 1, wherein transforming the digital image into the first augmented image comprises transforming the digital image as a function of a generative representation model, wherein the generative representation model comprises a plurality of image processing modules.

4. The apparatus of claim 1, wherein the image processing module is configured to:
receive the digital image from a digital image repository; and
modify the digital image.

5. The apparatus of claim 1, wherein transforming the signal data into the augmented image comprises transforming the signal data as a function of a generative representation model, wherein the generative representation model comprises a plurality of signal processing modules.

6. The apparatus of claim 1, wherein the signal processing module is configured to:
receive the signal data from a signal data repository; and
modify the signal data.

7. The apparatus of claim 1, wherein the first augmented image and the second augmented image are used to train a signal extraction module and a downstream task model.

8. The apparatus of claim 7, wherein the signal extraction module extracts digital signals from the digital image.

9. The apparatus of claim 1, wherein the machine learning model comprises a neural network, wherein the neural network is configured to:
receive a database comprising extensible markup language formatted digital images;
classify the database of extensible markup language formatted digital images; and
generate the outputs.

10. The apparatus of claim 9, wherein the neural network comprises a universal or multi layout based neural network model.

11. A method for training a machine learning model to augment signal data and image data, the method comprising:
receiving signal data;
generating a digital image, wherein the digital image comprises the signal data;
transmitting the digital image to an image processing module, wherein the image processing module produces a first augmented image;
transmitting the signal data to a signal processing module, wherein the signal processing module produces a second augmented image; and
training a machine learning model using the first augmented image and the second augmented image as inputs and a computer generated image of the signal data as outputs.

12. The method of claim 11, wherein generating the digital image comprises generating the digital image by processing the signal data and wherein processing the signal data comprises:
mapping the signal data to pixel values of the digital image; and
plotting the signal data to an image canvas.

13. The method of claim 11, wherein transforming the digital image into the first augmented image comprises transforming the digital image as a function of a generative representation model, wherein the generative representation model comprises a plurality of image processing modules.

14. The method of claim 11, wherein the image processing module is configured to:
receive the digital image from a digital image repository; and
modify the digital image.

15. The method of claim 11, wherein transforming the signal data into the augmented image comprises transforming the signal data as a function of a generative representation model, wherein the generative representation model comprises a plurality of signal processing modules.

16. The method of claim 11, wherein the signal processing module is configured to:
receive the signal data from a signal data repository; and
modify the signal data.

17. The method of claim 11, wherein the first augmented image and the second augmented image are used to train a signal extraction module and a downstream task model.

18. The method of claim 17, wherein the signal extraction module extracts digital signals from the digital image.

19. The method of claim 11, wherein the machine learning model comprises a neural network, wherein the neural network is configured to:
receive a database comprising extensible markup language formatted digital images;
classify the database of extensible markup language formatted digital images; and
generate the outputs.

20. The method of claim 19, wherein the neural network comprises a universal or multi layout based neural network model.

21. The apparatus of claim 1, wherein the at least a processor is further configured to feed the outputs of the trained machine learning model to a downstream task model.

22. The method of claim 11, the method further comprising feeding the outputs of the trained machine learning model to a downstream task model.

* * * * *